United States Patent
Oh

(10) Patent No.: US 9,915,277 B2
(45) Date of Patent: Mar. 13, 2018

(54) QUICK-THREADED ROD LOCKING DEVICE AND METHOD

(71) Applicant: ERICO International Corporation, Solon, OH (US)

(72) Inventor: Michael H.-S. Oh, Twinsburg, OH (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 0 days.

(21) Appl. No.: 15/084,273

(22) Filed: Mar. 29, 2016

(65) Prior Publication Data

US 2016/0208834 A1    Jul. 21, 2016

Related U.S. Application Data

(60) Continuation of application No. 14/665,031, filed on Mar. 23, 2015, now Pat. No. 9,303,676, which is a
(Continued)

(51) Int. Cl.
*A47B 96/06* (2006.01)
*F16B 2/06* (2006.01)
(Continued)

(52) U.S. Cl.
CPC .............. *F16B 2/065* (2013.01); *F16B 35/06* (2013.01); *F16B 37/045* (2013.01); *F16B 37/0864* (2013.01); *F16B 39/10* (2013.01)

(58) Field of Classification Search
CPC .................................. E04B 1/26; F16B 2/065
See application file for complete search history.

(56) References Cited

U.S. PATENT DOCUMENTS

| 516,555 A | 3/1894 | Smith |
|---|---|---|
| 544,724 A | 8/1895 | Cotton et al. |

(Continued)

FOREIGN PATENT DOCUMENTS

| CH | 0687221 A5 | 10/1996 |
|---|---|---|
| EP | 0352542 A2 | 1/1990 |

(Continued)

OTHER PUBLICATIONS

International Search Report and Written Opinion from corresponding International Application No. PCT/US09/62670; completed Jun. 11, 2010.
(Continued)

*Primary Examiner* — Amy J. Sterling
(74) *Attorney, Agent, or Firm* — Quarles & Brady LLP

(57) ABSTRACT

A device for securing threaded rod can include a housing and a threaded rod locking mechanism. The housing can include a rod locking body with a tapered bore, and a housing extension extending from an end of the rod locking body. The threaded rod locking mechanism can include two plunger pieces, each of which are movable within the tapered bore and include a respective threaded inner surface and a respective sloped outer surface that can engage the tapered bore. The threaded rod locking mechanism can also include a spring disposed within the tapered bore to bias the plunger pieces towards a narrow end of the tapered bore. The plunger pieces can be urged towards each other and towards an axis of the tapered bore by contact between the outer surfaces of the plunger pieces and an internal surface of the tapered bore.

19 Claims, 18 Drawing Sheets

Related U.S. Application Data division of application No. 13/886,344, filed on May 3, 2013, now Pat. No. 8,998,155, which is a continuation-in-part of application No. 13/417,370, filed on Mar. 12, 2012, now Pat. No. 8,434,725, which is a continuation of application No. 12/609,079, filed on Oct. 30, 2009, now Pat. No. 8,132,767.

(60) Provisional application No. 61/109,548, filed on Oct. 30, 2008.

(51) Int. Cl.
  *F16B 39/10* (2006.01)
  *F16B 35/06* (2006.01)
  *F16B 37/04* (2006.01)
  *F16B 37/08* (2006.01)

(56) References Cited

U.S. PATENT DOCUMENTS

| | | |
|---|---|---|
| 849,832 A | 4/1907 | Collins |
| 862,840 A | 8/1907 | Nelson et al. |
| 1,069,135 A | 8/1913 | Heberling |
| 1,144,403 A | 6/1915 | Williams |
| 1,144,430 A | 6/1915 | Powers |
| 1,257,040 A | 2/1918 | Steuernagel |
| 1,391,457 A | 9/1921 | Buckley et al. |
| 1,495,258 A | 5/1924 | Duty |
| 1,547,677 A | 7/1925 | Ouellet |
| 1,674,045 A | 6/1928 | James |
| 1,792,439 A | 2/1931 | Nelson |
| 1,875,274 A | 8/1932 | Soule |
| 1,959,985 A | 5/1934 | Moll |
| 2,177,816 A | 10/1939 | Wertman |
| 2,190,661 A | 2/1940 | Hauer |
| 2,315,196 A | 3/1943 | Gallione |
| 2,327,683 A | 8/1943 | Warner et al. |
| 2,356,209 A | 8/1944 | Brilhart |
| 2,476,731 A | 7/1949 | Hobbs |
| 2,487,853 A | 11/1949 | Coons |
| 2,520,325 A | 8/1950 | Moore |
| 2,572,615 A | 10/1951 | Hansen |
| 2,679,709 A | 6/1954 | DuBois |
| 2,814,324 A | 11/1957 | Shur |
| 2,819,923 A | 1/1958 | Doyle |
| 2,893,670 A | 7/1959 | Adams |
| 2,998,625 A | 9/1961 | Huber |
| 3,058,713 A | 10/1962 | Nemire et al. |
| 3,094,755 A | 6/1963 | Casanave |
| 3,171,624 A | 3/1965 | Leahy |
| 3,341,909 A | 9/1967 | Havener |
| 3,564,664 A | 2/1971 | Dage |
| 4,019,705 A | 4/1977 | Habuda et al. |
| 4,129,927 A | 12/1978 | Anderson |
| 4,178,661 A | 12/1979 | Klein |
| 4,216,568 A | 8/1980 | Anderson |
| 4,266,756 A | 5/1981 | Anderson |
| 4,406,047 A | 9/1983 | Jeffers et al. |
| 4,424,609 A | 1/1984 | Bodgen |
| 4,519,564 A | 5/1985 | Nadherny |
| 4,570,885 A | 2/1986 | Heath |
| 4,943,016 A | 7/1990 | Hennecke |
| 4,974,888 A | 12/1990 | Childers |
| 5,020,192 A | 6/1991 | Gerlach |
| 5,081,811 A | 1/1992 | Sasaki |
| 5,147,145 A | 9/1992 | Facey et al. |
| 5,282,825 A | 2/1994 | Muck et al. |
| 5,423,108 A | 6/1995 | Brennan |
| 5,548,873 A | 8/1996 | Macias |
| 5,551,901 A | 9/1996 | Jaeger |
| 5,947,424 A | 9/1999 | Heath |
| 6,003,210 A | 12/1999 | Facey et al. |
| 6,012,691 A | 1/2000 | van Leeuwen et al. |
| 6,031,508 A | 2/2000 | Ishizuka et al. |
| 6,058,574 A | 5/2000 | Facey et al. |
| 6,098,942 A | 8/2000 | Heath |
| 6,712,574 B1 | 3/2004 | Roopnarine |
| 6,898,905 B1 | 5/2005 | Kirschner |
| 6,976,565 B2 | 5/2005 | Meernik et al. |
| 7,039,987 B2 | 5/2006 | van Gijsel et al. |
| 7,150,078 B2 | 12/2006 | van Gijsel et al. |
| 7,346,962 B2 | 3/2008 | van Gijsel et al. |
| 8,132,767 B2 | 3/2012 | Oh et al. |
| 8,434,725 B2 | 5/2013 | Oh et al. |
| 8,881,478 B2 * | 11/2014 | Gray .................. E04B 1/26 411/267 |
| 2002/0037205 A1 | 3/2002 | Taneichi |
| 2003/0156922 A1 | 8/2003 | Giehl |
| 2005/0042059 A1 | 2/2005 | Bremer |
| 2005/0230582 A1 | 10/2005 | Birli et al. |
| 2006/0214073 A1 | 9/2006 | Mominee et al. |
| 2008/0277536 A1 | 11/2008 | 011E et al. |
| 2009/0266962 A1 | 10/2009 | Drane et al. |
| 2010/0037554 A1 | 2/2010 | Oh |
| 2012/0167358 A1 | 7/2012 | Oh et al. |
| 2013/0243545 A1 | 9/2013 | Oh |

FOREIGN PATENT DOCUMENTS

| | | |
|---|---|---|
| EP | 0855526 A1 | 7/1998 |
| JP | 2002168222 A | 6/2002 |
| JP | 2005127429 A | 5/2005 |
| WO | 2013020027 A1 | 2/2013 |

OTHER PUBLICATIONS

International Search Report and Written Opinion from corresponding International Application No. PCT/US2014/036752; completed Sep. 17, 2014.

"Electrical and Low Voltage/Datacom Fasteners", Erico Caddy, Copyright 2003, 7 pgs.

Fixing and Supports for Heating and Plumbing Installations, Erico Caddy, 3 pgs.

"Spring Steel Fasteners", B-Line, Copyright 1995, 5 pgs.

"Speed Link Universal Support System", Erico Caddy, Copyright 2003, 8 pgs.

Supplementary European Search Report from corresponding European Application No. EP09827987, dated Jan. 16, 2014.

* cited by examiner

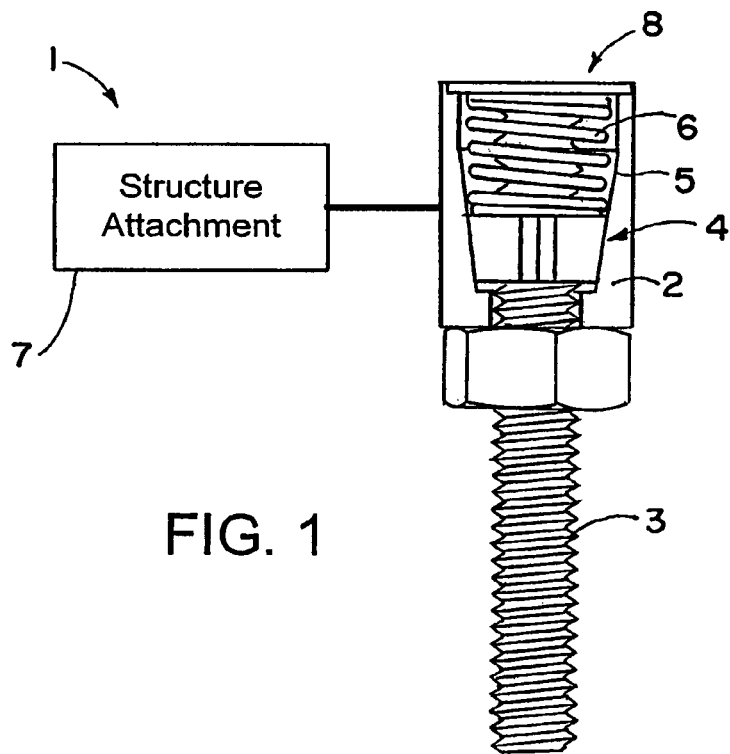
FIG. 1
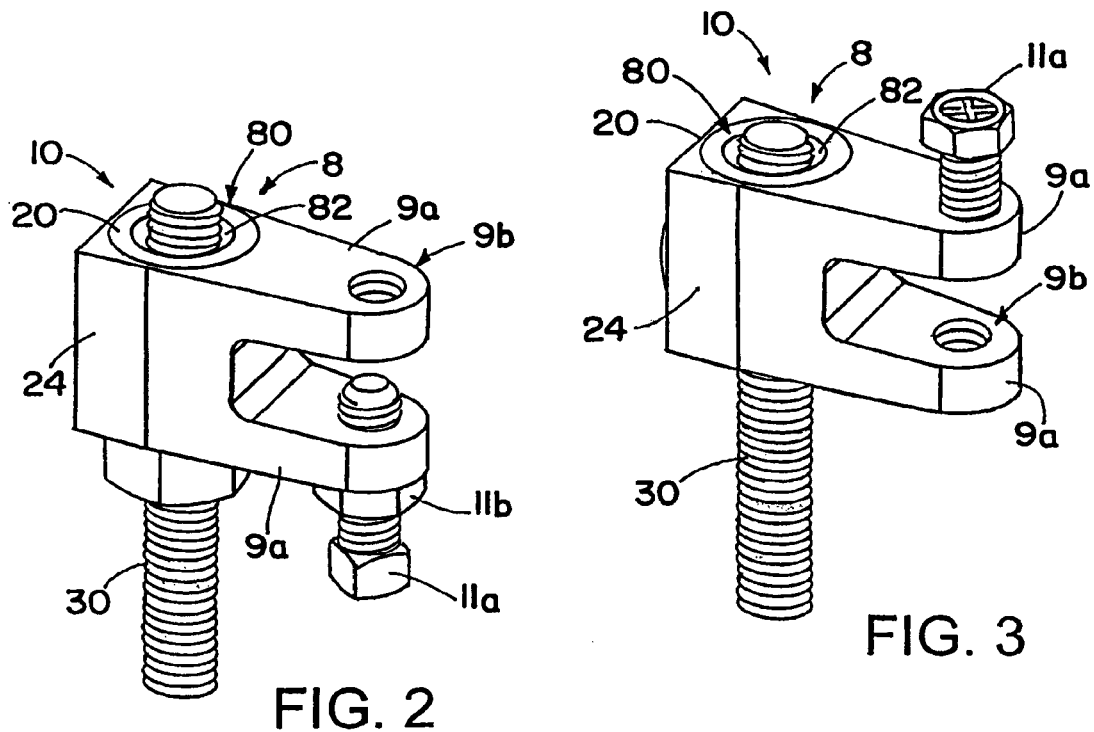
FIG. 2
FIG. 3

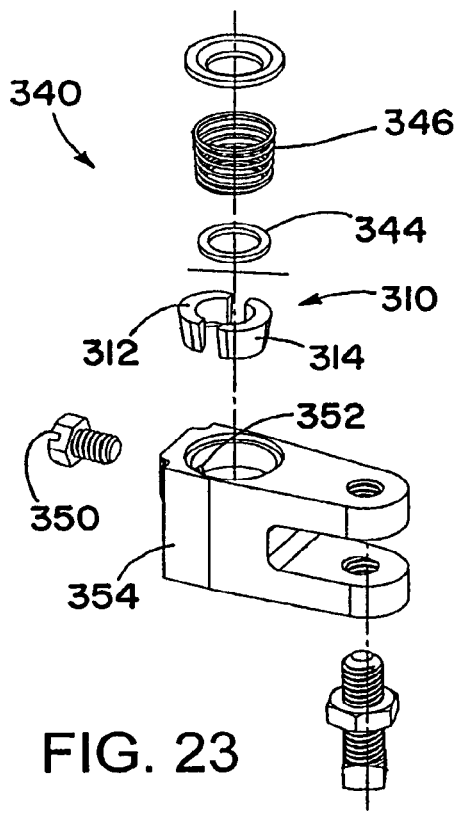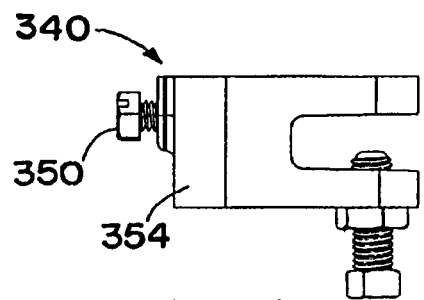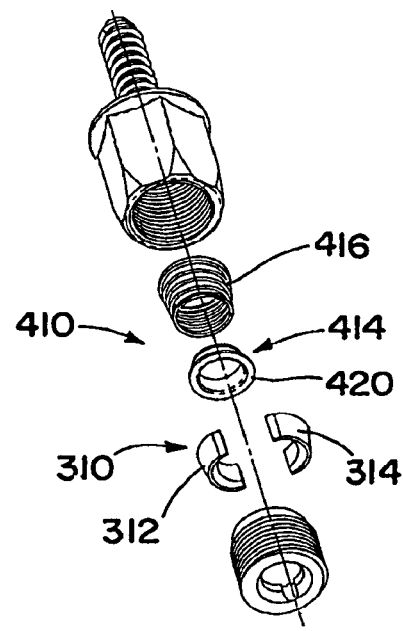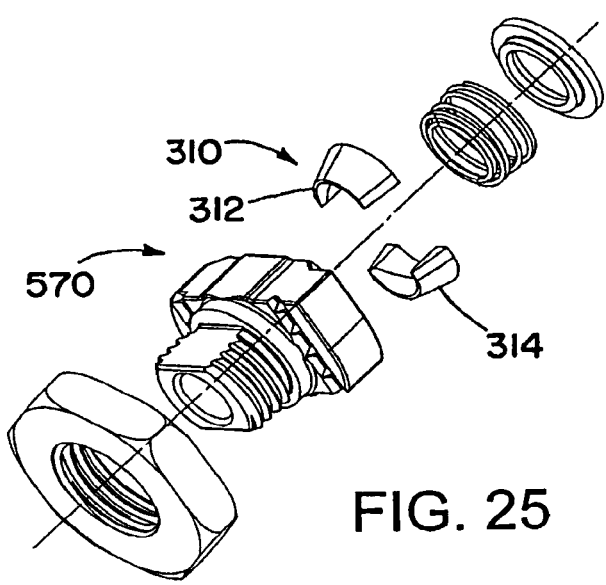
FIG. 22
FIG. 23
FIG. 24
FIG. 25

QUICK-THREADED ROD LOCKING DEVICE AND METHOD

RELATED APPLICATIONS

This application is a continuation of U.S. application Ser. No. 14/665,031, filed Mar. 23, 2015, which is a division of pending U.S. application Ser. No. 13/886,344, filed May 3, 2013, which is a continuation-in-part of U.S. application Ser. No. 13/417,370, filed Mar. 12, 2012, now U.S. Pat. No. 8,434,725, which is a continuation of U.S. application Ser. No. 12/609,079, filed Oct. 30, 2009, now U.S. Pat. No. 8,132,767, which claims priority under 35 USC 119 from U.S. Provisional Application No. 61/109,548, filed Oct. 30, 2008. The above applications are all incorporated herein by reference in their entireties.

BACKGROUND OF THE INVENTION

1. Field of the Invention

The invention is in the field devices for locking onto threaded rods.

2. Description of the Related Art

ERICO International Corp. sells the CADDY® SPEED LINK product family as a quick cable locking system that provides a means to suspend static loads from ceilings, structures, and sub-structures. However, prior items in the SPEED LINK product family have not included any quick threaded rod locking devices.

In recent years, installers in the field are increasingly using pre-fabricated, sub-assembled parts in order to maximize their installation labor savings. When installers install the pre-fabricated sub-assemblies on ceilings, structures, and sub-structures in the field, the installers cannot assemble them together without rotating threaded rod unless they disassemble the pre-fabricated sub-assemblies, because the threaded rod is a part of the pre-fabricated sub-assemblies. With the conventional beam clamps, conventional anchor bolts, and conventional strut nuts, the threaded rods have to be rotated into internal threads on the mating parts such as beam clamps, anchor bolts and strut nuts.

SUMMARY OF THE INVENTION

According to some embodiments of the invention, a device for securing threaded rod can include a housing and a threaded rod locking mechanism. The housing can include a rod locking body with a first end, a second end, and a tapered bore having an axis, an internal surface, a wide end, and a narrow end. The housing can also include a housing extension extending from the second end of the rod locking body, with a width of the housing extension being smaller than a width of the rod locking body. The threaded rod locking mechanism can include a first plunger piece and a second plunger piece, each of which are movable within the tapered bore and include a respective threaded inner surface and a respective sloped outer surface that can engage the tapered bore. The threaded rod locking mechanism can also include a spring disposed within the tapered bore to bias the first plunger piece and the second plunger piece towards the narrow end of the tapered bore. The first plunger piece can be urged towards the second plunger piece and towards the axis of the tapered bore by contact between the first outer surface of the first plunger piece and the internal surface of the tapered bore. The second plunger piece can be urged towards the first plunger piece and towards the axis of the tapered bore by contact between the second outer surface of the second plunger piece and the internal surface of the tapered bore.

According to some embodiments of the invention, an assembly for securing threaded rod can include a strut with a hole, a housing, and a threaded rod locking mechanism. The housing can include a rod locking body with a first end, a second end, and a tapered bore having an axis, an internal surface, a wide end, and a narrow end. The housing can also include a housing extension extending from the second end of the rod locking body, with a width of the housing extension being smaller than a width of the rod locking body. The threaded rod locking mechanism can include a first plunger piece and a second plunger piece, each of which are movable within the tapered bore and include a respective threaded inner surface and a respective sloped outer surface that can engage the tapered bore. The threaded rod locking mechanism can also include a spring disposed within the tapered bore to bias the first plunger piece and the second plunger piece towards the narrow end of the tapered bore. The first plunger piece can be urged towards the second plunger piece and towards the axis of the tapered bore by contact between the first outer surface of the first plunger piece and the internal surface of the tapered bore. The second plunger piece can be urged towards the first plunger piece and towards the axis of the tapered bore by contact between the second outer surface of the second plunger piece and the internal surface of the tapered bore. The housing extension can extend through the hole to secure the housing to the strut.

According to some embodiments of the invention, a device for securing threaded rod can include a housing and a threaded rod locking mechanism. The housing can include a rod locking body with a first end, a second end, and a tapered bore having an axis, an internal surface, a wide end, and a narrow end. The housing can also include a cylindrical housing extension extending from the second end of the rod locking body, with the cylindrical housing extension including an internal bore that is coaxial with and opens into the tapered bore, and with a width of the cylindrical housing extension being smaller than a width of the rod locking body. The threaded rod locking mechanism can include a first plunger piece and a second plunger piece, each of which are movable within the tapered bore and include a respective threaded inner surface and a respective sloped outer surface that can engage the tapered bore. The threaded rod locking mechanism can also include a spring disposed within the tapered bore to bias the first plunger piece and the second plunger piece towards the narrow end of the tapered bore. The first plunger piece can be urged towards the second plunger piece and towards the axis of the tapered bore by contact between the first outer surface of the first plunger piece and the internal surface of the tapered bore. The second plunger piece can be urged towards the first plunger piece and towards the axis of the tapered bore by contact between the second outer surface of the second plunger piece and the internal surface of the tapered bore.

Generally, the invention includes the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

FIG. 1 is a partially-schematic view of a threaded rod hanger in accordance with an embodiment of the invention.

FIG. 2 is an oblique view of one type of threaded rod hanger according to an embodiment of the invention, a beam clamp, in a first configuration.

FIG. 3 is an oblique view the beam clamp of FIG. 2, in a second configuration.

FIG. 22 is a side view of a beam clamp threaded rod hanger according to another embodiment of the invention.

FIG. 23 is an exploded view of the beam clamp of FIG. 22.

FIG. 24 is an exploded view of still another embodiment of threaded rod hanger according to the invention, an anchor bolt.

FIG. 25 is an exploded view of a further embodiment of threaded rod hanger according to the invention, a strut nut.

DETAILED DESCRIPTION

Figure 4:
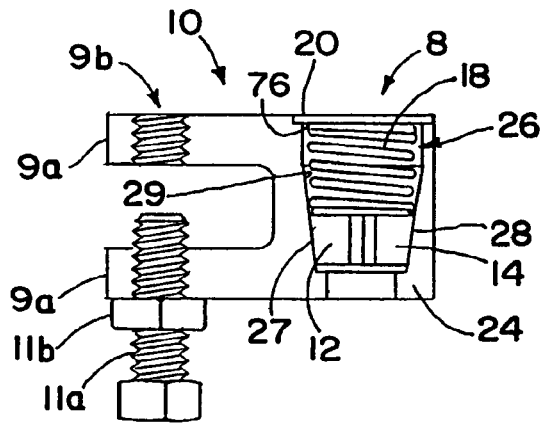
FIG. 4 is a cutaway view of the beam clamp of FIG. 2.

A threaded rod hanger has quick lock plunger mechanism that includes plunger pieces within a tapered bore in a housing. The plunger pieces have tapered outer surfaces and are spring-biased to position themselves toward the narrow end of the tapered bore. A spring within the housing presses the plunger pieces toward the narrow end of the bore, with the spring located between the plunger pieces and a back plate that closes off part of a wide end of the tapered bore. The plunger pieces have internally threaded surfaces that engage threads on a threaded rod that is inserted into the bore, between the plunger pieces. The plunger pieces have chamfers that aid in directing the threaded rod in between the plunger pieces. Once the threaded rod has been inserted between the plunger pieces and released, the plunger pieces are pushed toward the narrow bore end. This causes the plunger pieces to press inward, automatically causing the internal plunger half threads to engage the external threads on the threaded rod.

FIG. 1 shows a threaded rod hanger 1 that includes a quick lock plunger mechanism 8 in a housing 2. The plunger mechanism 8 is used for threadedly engaging and holding a threaded rod 3. As explained in greater detail below, the plunger mechanism 8 includes plunger parts or pieces 4 that are located in a tapered bore 5 in the housing 2. A spring 6 biases the plunger parts 4 toward a narrow end of the tapered bore 5, a position that presses the plunger parts 4 inward toward the threaded rod 3. This causes threads on radially inward surfaces of the plunger parts 4 to engage the external threads on the rod 3, securing the rod within the housing 2. In addition, it is possible to turn the rod 3, threading the rod 3 further into or out of the bore 5, providing height adjustment as needed.

The threaded rod hanger 1 has a structure attachment 7 for attaching the rod hanger 1 to some sort of building structure, or for hanging items from threaded rods. The structure attachment 7 may have any of a variety of suitable forms for attaching to different types of structure, producing different types of rod hangers. For example the rod hanger may be a beam clamp, with the structure attachment being able to clamp onto the flange of a beam or other device (plate, pipe, etc.), such as by a screw clamping the flange (or other structure) against a jaw portion or leg. As another example the rod hanger may be an anchor bolt that has a screw portion configured to be installed on concrete ceilings and/or decking. In a further example the rod hanger may be a strut nut that engages a channel, which may be attached to a ceiling, for example. It will be appreciated that these are only a few of the many possible configurations and types of structural attachment that may be utilized in the rod hanger.

The various embodiment threaded rod hangers described herein may be made of any of a variety of suitable materials. An example suitable material is steel, but it will be appreciated that other materials may be used alternatively or in addition.

FIGS. 2 and 3 show a beam clamp 10 that includes a quick lock plunger mechanism 8 in accordance with an embodiment of the present invention. The quick lock plunger mechanism 8 is adapted into the beam clamp 10 as a part of a quick lock beam clamp 10. Such quick lock beam clamps 10 may be configured for up to 0.5 inch (12.7 mm) flange thickness in order to minimize the beam clamp size. The quick lock beam clamp 10 shown on FIG. 1 may be used for hanging a mechanical sprinkler pipe.

The quick lock beam clamp configuration shown in FIG. 3 is configured for general electrical applications. This configuration may be used to engage 0.25 inch (6.4 mm) or M6 threaded rods, for example. It will be appreciated that the uses and sizes are only examples, and the clamp 10 in its various configurations can be used in other ways, and may have different sizes from those described.

The structure attachment of the beam clamp 10 may involve a pair of jaw portions or legs 9a for receiving a flange or other part therebetween. The jaw portions or legs 9a extend from a housing of the beam clamp 10. The legs 9a and the housing may be parts of a single monolithic piece of material. Threaded holes 9b in each of the jaw portions (or legs) 9a may be used for receiving a bolt 11a, which may be used to secure the flange or other part by pressing it against the opposite jaw portion. A nut 11b may be threaded onto the bolt 11a in order to aid in securing the bolt 11a in place. The bolt 11a may have any of a variety of configurations, including a square-head configuration (FIG. 2) or a hex-head configuration (FIG. 3).

Figure 5:
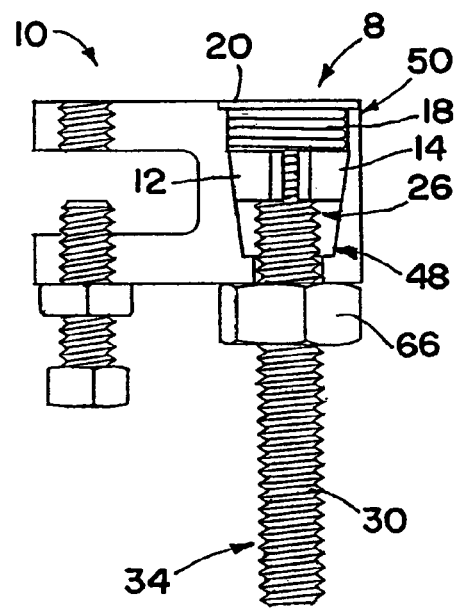
FIG. 5 is a cutaway view of the beam clamp of FIG. 2, with a threaded rod being inserted.
Figure 6:
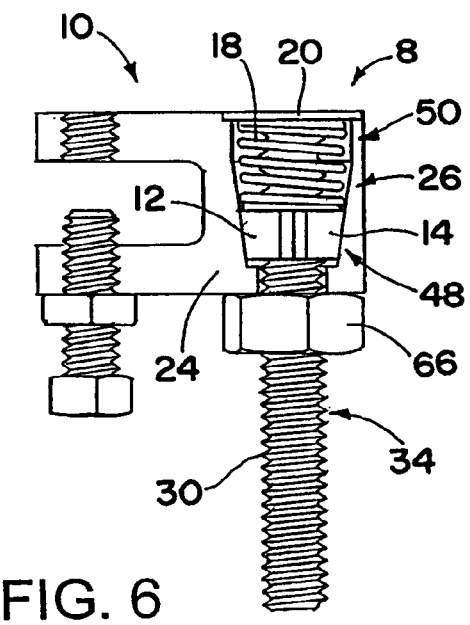
FIG. 6 is a cutaway view of the beam clamp of FIG. 2, with the threaded rod inserted and locked in place.

With reference now in addition to FIGS. 4-6, the threaded rod locking mechanism 8 of the beam clamp 10 (or either configuration) includes two plunger halves (plunger pieces) 12 and 14, a shoulder taper spring 18, a back plate 20, and a housing 24 that has a tapered bore 26. The plunger pieces 12 and 14 are located within the threaded bore 26, and have external surfaces 27 and 28 that can be in contact with an internal surface 29 of the bore 26. The external plunger surfaces 27 and 28 may be smooth, to allow them to slide easily along the smooth bore internal surface 29. The external plunger surfaces 27 and 28 may be sloped, for example substantially matching a slope in a sloped portion of the bore internal surface 29.

The plunger pieces 12 and 14 may each have a substantially semiannular shape (half of an annular shape). Together the plunger pieces 12 and 14 define an opening between them, through which a threaded rod 30 may be received.

FIG. 5 shows the threaded rod 30 pushed through the plunger set 12 and 14. FIG. 6 shows the locking mechanism 8 when the pushing of the threaded rod 30 is stopped. In this configuration internal threads 32 (FIG. 7) on the plunger set 12 and 14 are matched with and engage external threads 34 on the threaded rod 30. This configuration is maintained by spring force from the taper spring 18 pressing the plunger pieces 12 and 14 against the tapered bore 26 of the housing 24 of the beam clamp or other device 10.

Figure 7:
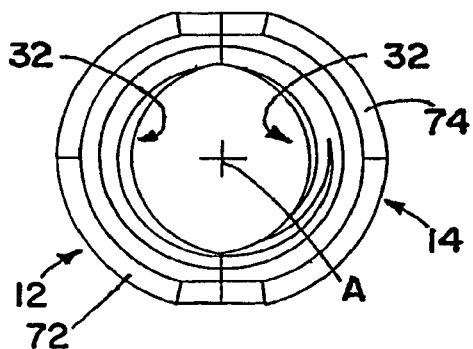
FIG. 7 is a top view of a plunger set of the beam clamp of FIG. 2, with the plunger pieces together.
Figure 8:
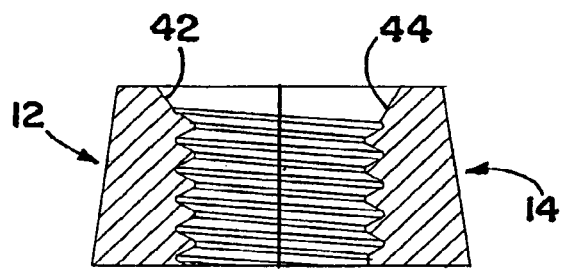
FIG. 8 is a sectional view of the plunger set of FIG. 7.
Figure 9:
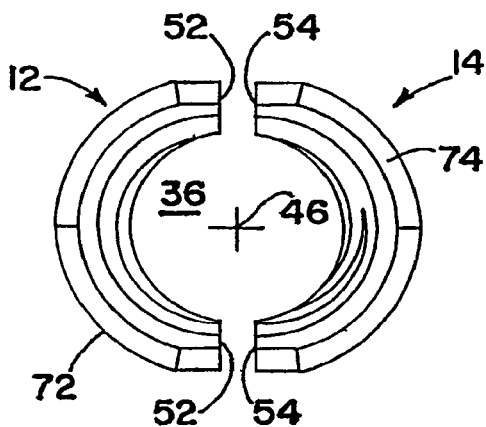
FIG. 9 is a top view of a plunger set of the beam clamp of FIG. 2, with the plunger pieces separated.

Prior to insertion of the threaded rod 30, the plunger set (the plunger pieces 12 and 14) is in a free condition, with the two plunger pieces 12 and 14 together as shown in FIGS. 4 and 7. When the threaded rod 30 pushes through the plunger set 12 and 14, the inserted end of the threaded rod 30 first pushes on chamfers 42 and 44 (FIG. 8) at the bottom of the two plunger pieces 12 and 14. The chamfers 42 and 44 may be angled at an angle of about 35 degrees to a central axis 46, as illustrated in FIG. 8. The central axis 46 is also the axis of the bore 26, and of the inserted threaded rod 30. The pushing of the rod 30 into the plunger set pushes the plunger pieces 12 and 14 apart, further opening a space or opening 36 defined between the plunger pieces 12 and 14, as shown in FIGS. 5 and 9. This allows the threaded rod 30 to pass through the plunger set 12 and 14, between the plunger pieces 12 and 14. The plunger set is also moved longitudinally (axially) along the bore 26 in a direction away from a narrow end 48 of the bore 26, and toward a wide end 50 of the bore 26, against spring biasing force from the spring 18. The movement of the plunger set axially brings it into a wider area of the bore 26, allowing the plunger pieces 12 and 14 to separate from each other.

Figure 10:
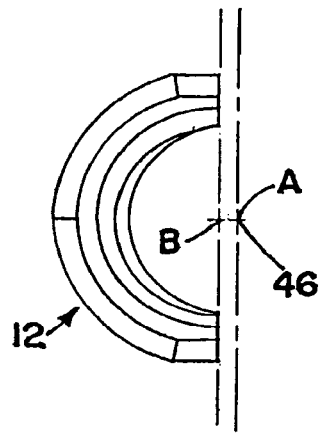
FIG. 10 is a top view of one of the plunger pieces of the plunger set of FIG. 9.

As shown in FIGS. 5 and 9, the plunger pieces 12 and 14 separate from each other by moving apart from one another in a horizontal (radial) direction, not in a circumferential direction. In other words, the plunger pieces 12 and 14 can move horizontally away from each other, as shown in FIG. 9, when the threaded rod 30 is passed through the plunger set 12 and 14. In this separation end faces 52 of the plunger half 12 separate from end faces 54 of the plunger half 14. To allow passage of the threaded rod 30 when the halves 12 and 14 are separated, the minor diameter of the internal threads 32 of the of the plunger pieces 12 and 14 is larger than the major diameter of the external threads 34 of the threaded rod 30. With reference now in addition to FIG. 10, the origin about which the internal threads 32 are laid out is shifted to a center B. The center B is offset from a point A that is the center of the two halves 12 and 14 when the halves are in contact with each other, as in FIG. 7. In other words, the threaded inner surfaces (internal threads) 32 cooperate with one another to produce a threaded receptacle for receiving the external threads 34 of the threaded rod 30 only when the plunger pieces 12 and 14 are not in contact with one another (are separated from one another). In addition, the minor diameter (or minor radius) for internal threads 32 on the plunger set 12 and 14 should be slightly larger than the major diameter of the external threads 34 of the threaded rod 30. This is so that the threaded rod 30 can pass through the plunger set 12 and 14 when the plunger set 12 and 14 is at the open position. In order to minimize the plunger size and housing size, the gap distance between center A and the center B is important.

After the external threads 34 on the threaded rod 30 are engaged with the internal threads 32 on two halves 12 and 14 of the plungers, the two plunger halves 12 and 14 rest on the housing taper bore 26, as shown on FIG. 6. This means that two plunger halves 12 and 14 do not compress the threaded rod 30. Therefore, the threaded rod 30 can freely be rotated relative to the beam clamp 10 whenever height adjustment is needed. A nut 66 (FIGS. 5 and 6) may be used to hold the beam clamp 10 in place at a desired location along the threaded rod 30.

Figure 11:
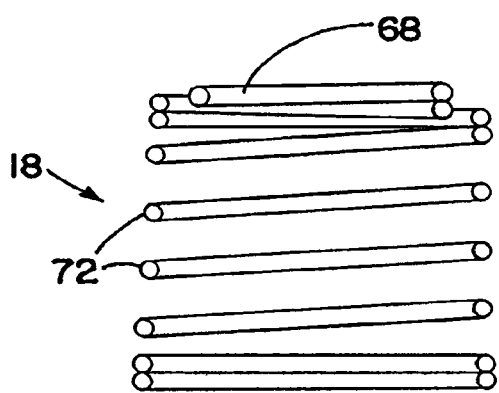
FIG. 11 is a cross-sectional view of a spring used in the beam clamp of FIG. 2.

With reference to FIG. 11, the spring 18 is a tapered coil spring that has a single shoulder coil 68 that engages the threaded hole in between the plunger pieces 12 and 14. The shoulder coil 68 has a smaller radius than the other coils 72 of the spring 18. The shoulder coil 68 keeps the spring 18 from becoming disengaged from the plunger pieces 12 and 14.

The spring 18 is between plunger set (plunger pieces or halves) 12 and 14, and the back plate 20. The back plate 20 is press fit and staked into the housing 24 to encase the spring 18. The back plate 20 instead may be seated, threaded, or coupled to the housing 24. Alternatively the spring 18 may be threaded into or otherwise coupled to the housing 24. On one side the spring 18 presses the plunger pieces 12 and 14, such as being located in the opening 36 (FIG. 9). Alternatively, the spring 18 may press against upper plunger surfaces 72 and 74 (FIGS. 7 and 9) of the plunger pieces 12 and 14, or against washers on top of the plunger pieces 12 and 14. On the opposite side the spring 18 presses against an inner surface 76 of the back plate 20. The back plate 20 has a central hole 80 to allow the threaded rod 30 to pass therethrough. In inserting the threaded rod 30 at least part of the threaded rod 30 may pass through the hole 80. An inward-bent back plate lip 82 may surround the hole 80 and protrude inward into the tapered bore 26 from the inner surface 76. This may aid in securing the spring end in contact with the back plate inner surface 76.

For the beam clamp 10, two mounting methods may be available: top mounting (see FIG. 2) and bottom mounting (FIG. 3). For the conventional beam clamp, the beam clamp is typically upside down for the bottom mounting. However, for the quick lock beam clamp, the beam clamp cannot be upside down for the bottom mounting. Therefore, the beam clamp may have two mounting legs, a top mounting leg and bottom mounting leg, with each mounting leg having an internally threaded hole for the flange mounting screw. For bottom mounting the installer can put the square head (or combo hex head) and cup point set screw into the internal thread hole located at the bottom mounting leg, as shown in FIGS. 2 and 4, for instance. For top mounting the installer can put the square head (or combo hex head) and cup point set screw into the internal thread hole located at the top mounting leg, as shown on FIG. 3. Therefore one quick lock beam clamp can be used for both top mounting and bottom mounting.

Although the threaded rod engagement has been described above in terms of a beam clamp, it will be appreciated that a similar engagement may be part of the other sorts of device described herein, such as anchor bolts and strut nuts.

Figure 12:
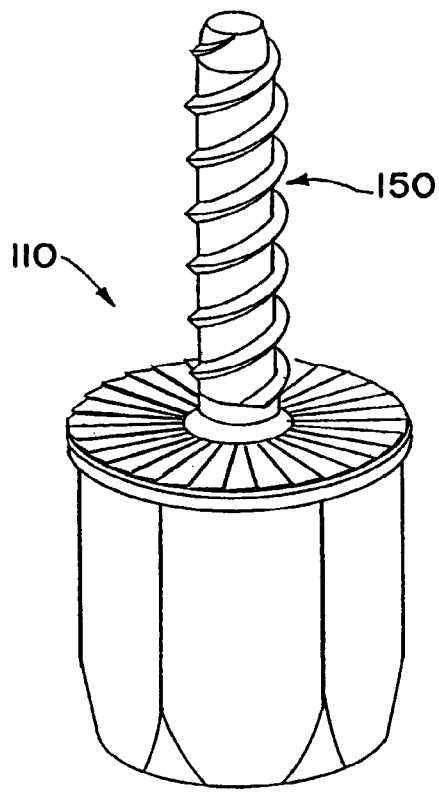
FIG. 12 is an oblique view of another type of threaded rod hanger according to an embodiment of the invention, an anchor bolt.
Figure 13:
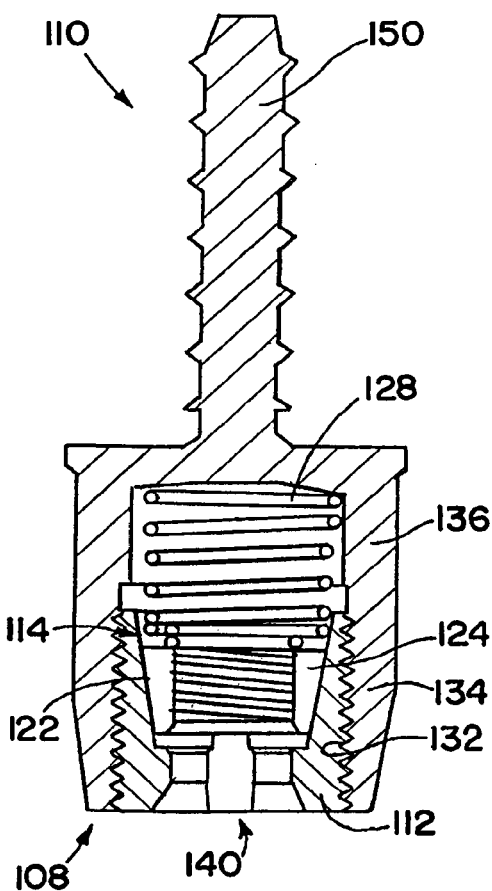
FIG. 13 is a cross-sectional view of the anchor bolt of FIG. 12.

FIGS. 12 and 13 show a quick lock plunger mechanism 108 that is adapted into an anchor bolt as a part of quick lock anchor bolt 110. The anchor bolt is intended to be installed in concrete ceilings and/or decking. FIGS. 12 and 13 shows a specific embodiment, a 0.375 inch (9.5 mm) quick lock anchor bolt, but it will be appreciated that other sizes and configurations are possible.

The quick lock anchor bolt 110 consists of the anchor bolt, a housing insert 112 (part of the housing) with a tapered bore 114, two halves of plungers (plunger halves or pieces) 122 and 124, and shoulder taper spring 128, as shown on FIG. 13. External threads 132 are on the outside wall of the housing insert 112 and internal threads 134 are on the inside wall of the rest of the anchor bolt housing 136, so that two parts are tightened together as shown on FIG. 13. One end of the spring 128 is in contact with part of the anchor bolt housing 136, while the other end of the spring 128 is in contact with the plunger pieces 122 and 124, or a washer on the plunger pieces 122 and 124. The tapered bore in the insert 112 forms a blind hole in the housing of the anchor bolt 110.

The operation of the plunger mechanism 108 is similar to that of the plunger mechanism 8 (FIG. 4) that is described above. Inserting a threaded rod into an opening 140 in the housing insert 112 pushes the plunger pieces 122 and 124 axially upward against the spring force provided by the spring 128. The plunger pieces 122 and 124 separate to allow the threaded rod to enter between them. When the insertion force on the threaded rod is released the spring 128 pushes the plunger pieces 122 and 124 downward against internal walls of the tapered bore 114. The sloped internal bore walls press inward against the sloped external surfaces of the plunger pieces 122 and 124. This causes the internal threads of the plunger pieces 122 and 124 to engage the external threads of the threaded rod. This locks the threaded rod from being pulled out of the housing insert 112, although the threaded rod can still be screwed into or out of the housing insert 112.

The anchor bolt 110 has a wedge anchor 150 on an opposite side from the plunger mechanism 108. The wedge anchor 150 is used to secure the anchor bolt 110 in concrete, such as a concrete ceiling or floor. The wedge anchor 150 is fully threaded, but it will be appreciated that alternatives exist, including partially-threaded wedge anchors and non-wedge anchors.

The anchor bolt 110 may be used to quickly, easily, and removably secure a threaded rod to a concrete structure. The threaded rod can be easily inserted into an anchor bolt that is already secured in concrete, and released so as automatically to lock the threaded rod into place.

Figure 14:
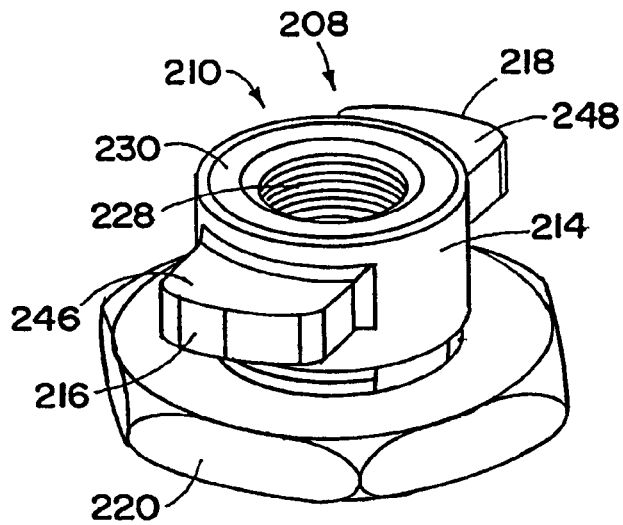
FIG. 14 is an oblique view of yet another type of threaded rod hanger according to an embodiment of the invention, a strut nut.
Figure 15:
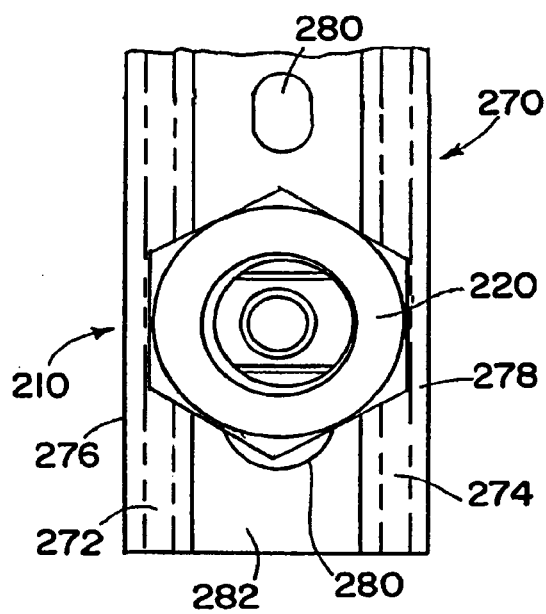
FIG. 15 is a plan view showing the strut nut of FIG. 14 mounted to a top of a strut.
Figure 16:
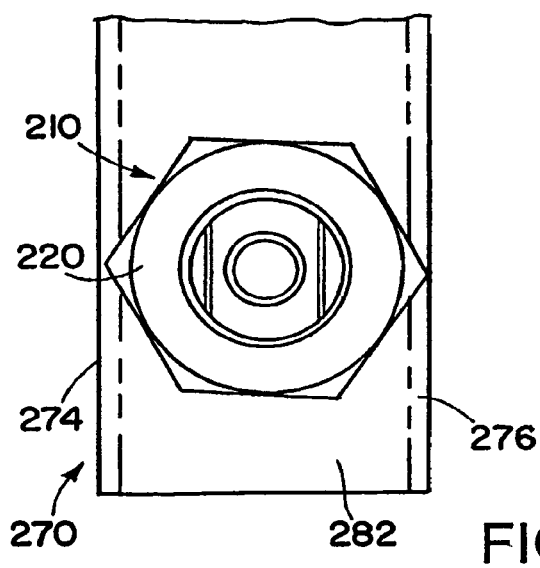
FIG. 16 is a bottom view showing the strut nut of FIG. 14 mounted to a bottom of a strut.

FIGS. 14-17 show various views of a strut nut 210 that includes a quick lock plunger mechanism 208. The quick lock plunger mechanism 208 is adapted into the strut nut as a part of a quick lock strut nut 210. FIG. 14 shows a 0.375 inch (9.5 mm) quick lock strut nut. FIG. 15 shows an example of the top strut mounting and FIG. 16 shows an example of the bottom strut mounting.

Figure 17:
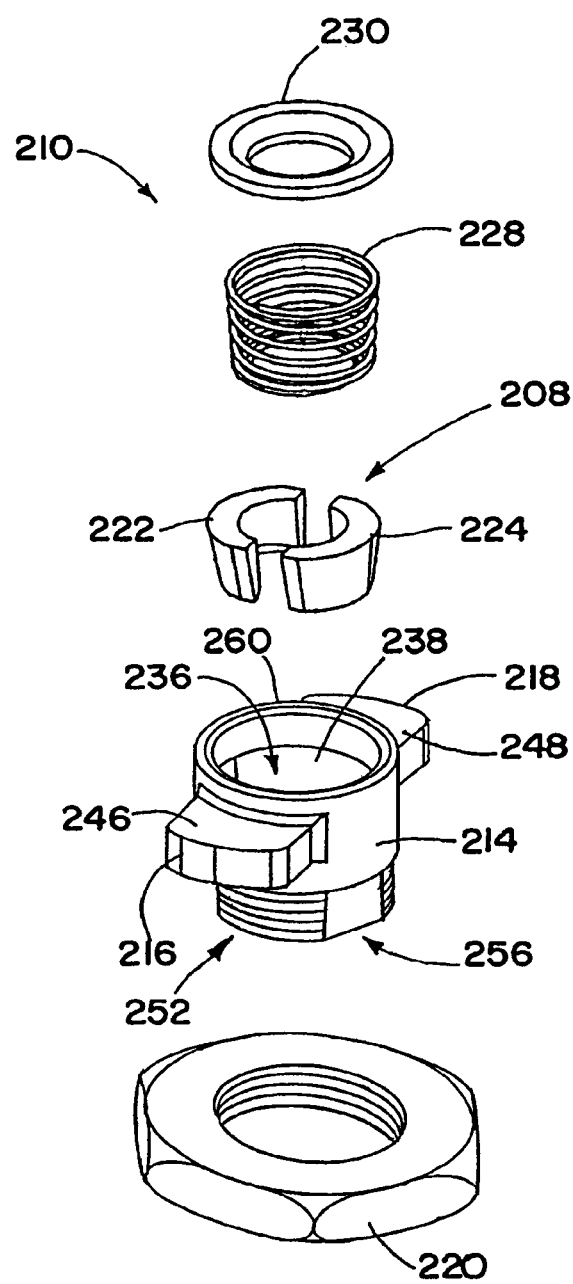
FIG. 17 is an exploded view of the strut nut of FIG. 14.

With reference especially to FIG. 17, the strut nut 210 consists of a housing 214 with cam keys 216 and 218, a jam nut 220, two plunger pieces 222 and 224, a shoulder taper spring 228, and a back plate 230, as shown on FIG. 15. The strut nut housing 214 contains the tapered bore 236 with an inner surface 238 for use as a plunger seat. Two wings 246 and 248 of the strut nut housing 214 have locking cam keys 216 and 218 for engaging a strut. The housing 214 has external threads 252 for the jam nut 220, as well as double D-shape cutouts, such as at 256, for strut bottom mounting. The housing 214 also has a shoulder bore 260 for the back plate seat. The jam nut 220 prevents the horizontal slips from the strut when the load is applied.

Figure 18:
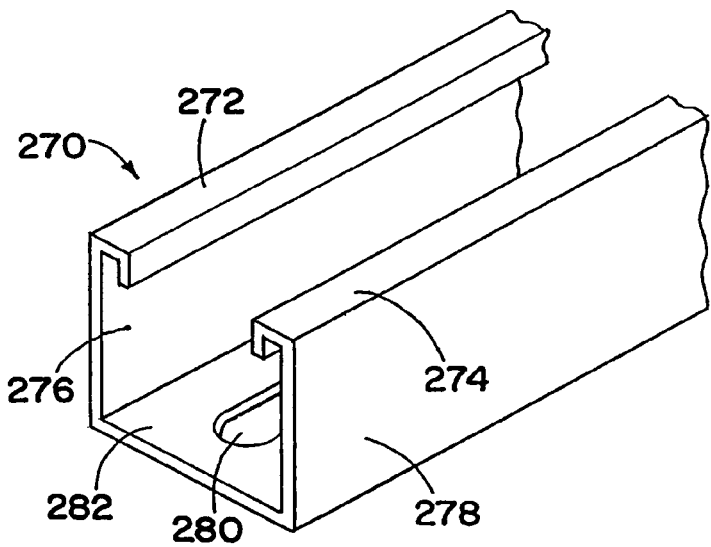
FIG. 18 is an oblique view of a strut used to mount the strut nut of FIG. 14.

The strut nut 210 can engage a strut or channel 270 (FIG. 18) in multiple ways. FIG. 15 shows the strut nut 210 mounted at the top of the strut 270, with the strut nut 210 engaging rails 272 and 274 of the strut 270. The rails 272 and 274 are clamped between the wings 246 and 248 within the strut 270, and the jam nut 220, which is outside of the strut 270 and tightened up to be in contact with the rails 272 and 274. The cam keys 216 and 218 on the ends of the wings 246 and 248 engage side walls 276 and 278 of the strut 270 to prevent rotation of the strut nut 210.

FIG. 16 shows the strut nut 210 mounted on the bottom of the strut 270, with part of the strut nut housing 214 passing through one of the holes 280 (FIGS. 15 and 18) in a base 282 of the strut 270. The base 282 is clamped between the wings 246 and 248, which are inside the strut 270, and the jam nut 220, which is outside of the strut 270 and tightened up to be in contact with the base 282. The cam keys 216 and 218 on the ends of the wings 246 and 248 engage side walls 276 and 278 of the strut 270 to prevent rotation of the strut nut 210.

Regardless of where the strut nut 210 is coupled to the strut 270, the plunger mechanism 208 may be used to receive and lock in place a threaded rod. The operation of the plunger mechanism 208 is similar to the operation of the mechanism 8 described above. The incorporation of the mechanism 208 in the strut nut 210 allows a threaded rod to be quickly and easily secured to a strut that is mounted to structure of various sorts, or being hung from a structure, such as in a trapeze-type arrangement.

Among the advantages of the various embodiments and concepts described herein are: labor savings from the quick-lock push in and lock feature for locking to a threaded rod; pre-fabricated subassembly that does not allow the threaded rod rotation during the assembly; easier assembly for a trapeze; and easier assembly for an anchor bolt.

Figure 19:
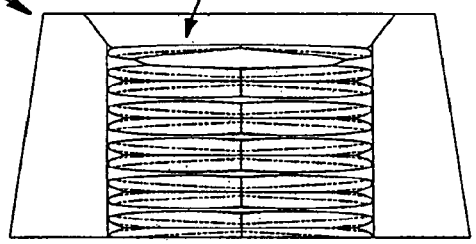
FIG. 19 is a side view of a plunger half according to an alternate embodiment plunger set usable as part of a threaded rod hanger of the present invention.
Figure 20:
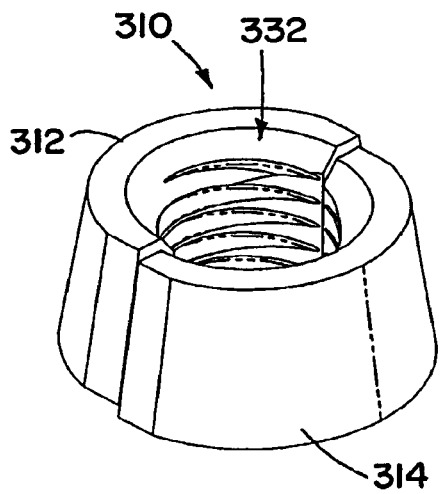
FIG. 20 is an oblique view of a plunger or plunger set formed from two plunger pieces of the type shown in FIG. 19.
Figure 21:
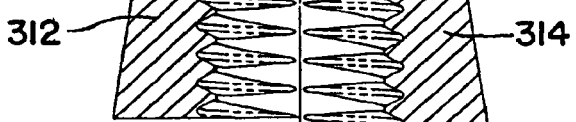
FIG. 21 is a cross-sectional view of the plunger of FIG. 20.

FIGS. 19-21 show an alternate plunger 310 having plunger pieces 312 and 314 that are substantially identical to one another. The plunger pieces 312 and 314 have threaded internal surfaces 332 that combine to make a threaded receptacle for receiving and engaging a threaded rod when the plunger pieces 312 and 314 are offset in a longitudinal direction, as shown in FIGS. 20 and 21, so as to allow the threads from the two plunger pieces 312 and 314 to line up with each other. The threads on the plunger pieces 312 and 314 are each symmetric with regard to the longitudinal direction of the plunger pieces 312 and 314. It will be appreciated that the plunger 310 may be utilized in any of the various sorts of threaded rod hangers described herein.

FIGS. 22 and 23 show a beam clamp 340 that includes the plunger set 310. The beam clamp 340 has many parts in common with or similar to corresponding parts of the beam clamp 10 (FIG. 2). These similar parts are not described again with regard to the beam clamp 340. The beam clamp 340 has a washer 344 between the plunger pieces 312 and 314, and a coil spring 346. The washer 344 helps maintain the plunger pieces 312 and 314 in place, preventing collapse (misalignment) of the plunger pieces 312 and 314 when pressed against by a threaded rod having a sharp burr.

The beam clamp 340 also has a set screw or side screw 350 that is threaded into a threaded hole 352 in the clamp body 354. The threaded hole 352 may be substantially perpendicular to an axis of the tapered bore in which the plunger pieces 312 and 314 reside. The set screw 350 can be used to press against the plunger set 310 in order to more tightly secure the plunger pieces 312 and 314 against a threaded rod. The set screw 350 may also be used to prevent uplift of the plunger set 310. Toward that end, the screw 350 may either press against the side surfaces of the plunger set 310, or else may have its tip above the top surfaces (larger-radius end) of the plunger set 310.

FIG. 24 shows an anchor bolt 410 that includes the plunger set 310. The anchor bolt 410 has many parts similar to those of the anchor bolt 110 (FIGS. 12 and 13). One difference is the use of a cap washer 414 between the plunger set 310 and a spring 416. The cap washer 414 has a flange 420 that pressed against top surfaces of the plunger pieces 312 and 314. The opposite end of the cap washer 414 is inserted into an end of the spring 416. This allows the cap washer 414 and the spring 416 to be assembled together.

FIG. 25 shows a strut nut 510 that is similar to the strut nut 210 (FIG. 14) in most respects. One difference is that the strut nut 510 incorporates the plunger set 310, with plunger pieces 312 and 314.

The various embodiments shown herein show securement of threaded rods having a substantially vertical orientation. It will be appreciated that threaded rod hangers such as described herein may also be used to mount or be mounted to threaded rods in other orientations, for example horizontal threaded rods. In addition it will be appreciated that different configurations of threaded rod hangers may be used for securing or securing to threaded rods in non-vertical orientations.

Figure 26:
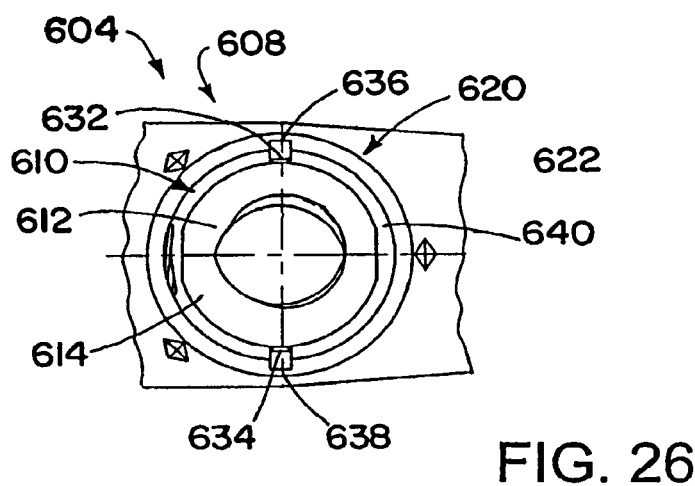
FIG. 26 is a top view of a still further embodiment threaded rod hanger according to the invention.
Figure 27:
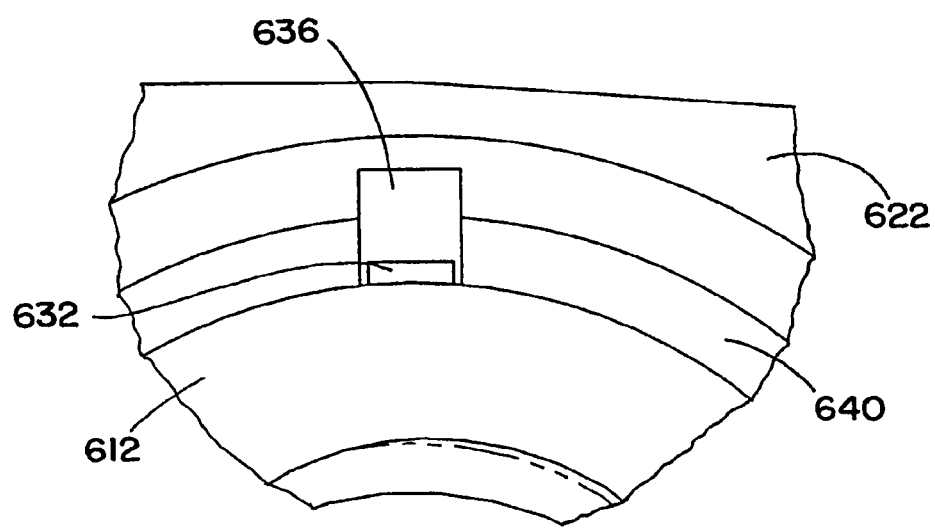
FIG. 27 is a detail view of a portion of the threaded rod hanger of FIG. 26.

FIGS. 26 and 27 show a threaded rod hanger 604 with a quick-lock plunger mechanism 608 that includes a plunger set 610 that in turn includes plunger pieces 612 and 614. The plunger pieces 612 and 614 fit into a tapered bore 620 in a housing 622, as generally described above with regard to other embodiments. The mechanism 608 operates in a manner similar to that described above in other embodiments, and may have other suitable corresponding parts, such as a coil spring and a back plate.

One difference is that the plunger pieces 612 and 614 have radially-outward-protruding keys 632 and 634. The keys 632 and 634 engage corresponding grooves 636 and 638 in the tapered bore surface 640. The keyed connection between the plunger pieces 612 and 614 and the housing 622 helps keep the plunger pieces 612 and 614 properly oriented within the bore 620.

It will be appreciated that the mechanism 608 shown in FIGS. 26 and 27 may be used in any of the types of or specific embodiments of threaded rod hangers described herein. The various features described with regard to various embodiments may be combinable as suitable in a single device.

Figure 28:
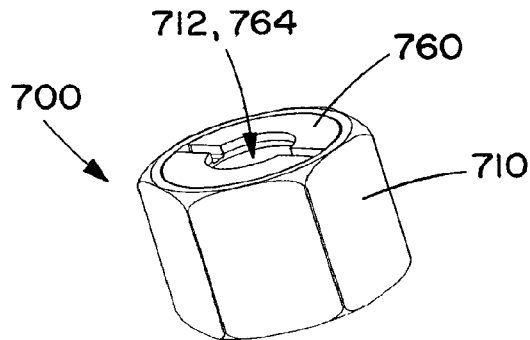
FIG. 28 is an oblique view of a threaded rod securement or hanger portion according to an embodiment of the invention.
Figure 29:
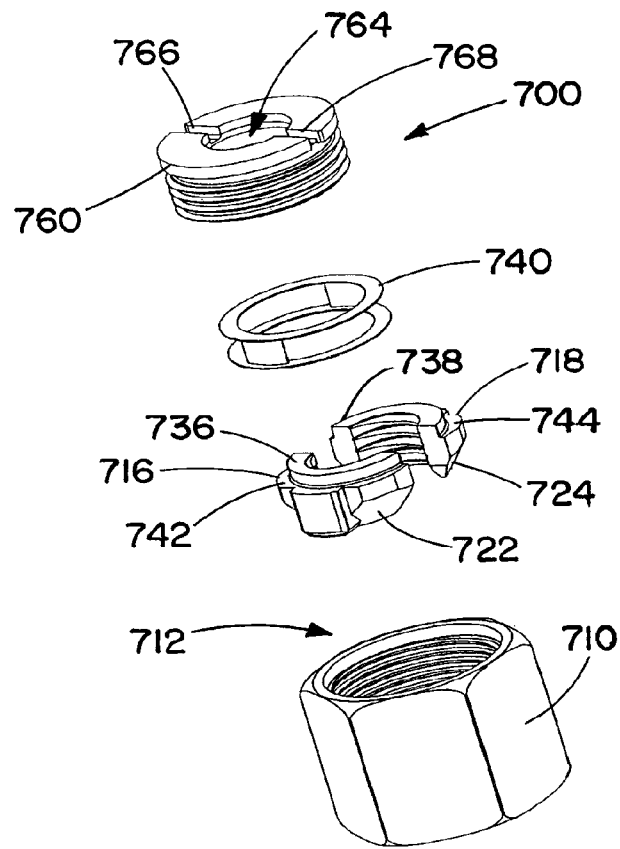
FIG. 29 is an exploded view of the threaded rod securement portion of FIG. 28.
Figure 30:
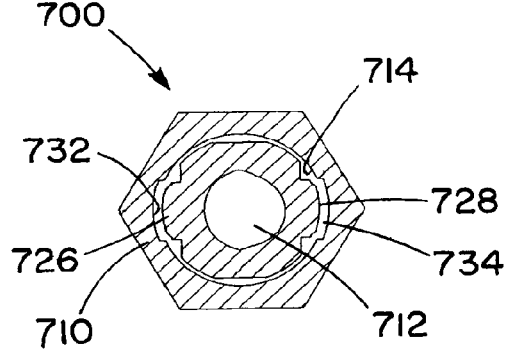
FIG. 30 is a sectional view of the threaded rod securement portion of FIG. 28.

FIGS. 28-30 show a threaded rod securement or hanger portion 700, part of a threaded rod securement, for securing to a threaded rod to some sort of additional object. A housing 710 has a hole 712 therein. The hole 712 is bounded in part by a tapered inner surface 714 of the housing 710. A pair of plunger pieces 716 and 718a located in the hole 712, within the tapered inner surface 714. Sloped outer surfaces 722 and 724 of the plunger pieces 716 and 718 engage the tapered inner surface 714, to press the plunger pieces 716 and 718 inward toward the center of the hole 712 (a center of the tapered inner surface 714), as well as toward each other.

The plunger pieces 716 and 718 may have keys 726 and 728 that engage corresponding grooves 732 and 734 in the tapered inner surface 714. The engagement of the keys 726 and 728 with the grooves 732 and 734 aids in keeping the plunger pieces 716 and 718 properly aligned within the housing 710. As described further below, the engagement of the keys 726 and 728 with the grooves 732 and 734 may also be used to allow rotation of the housing 710 and the plunger pieces 716 and 718 as a single unit.

The plunger pieces 716 and 718 have ridged inner surfaces 736 and 738, such as threaded inner surfaces, for engaging a threaded rod (not shown) or other similar object. The engagement of the plunger pieces 716 and 718 may be accomplished in a manner similar to that described above with regard to other embodiments.

A spring 740 is located within the hole 712 to provide a spring force biasing the plunger pieces 716 and 718 toward the narrow end of the tapered inner surface 714. In the illustrated embodiment the spring 740 is a wave spring. The spring 740 rests on ledges 742 and 744 of the plunger pieces 716 and 718. Protruding ridges 746 and 748 of the plunger pieces 716 and 718 are at least partially inside an inner diameter of the spring 740. A wave spring has the advantage of being better able to resist misalignment within the housing 710. In addition, wave springs are more compact (up to 90% more compact) than alternative springs, such as coil springs. Wave springs also may have a more controlled movement. Wave springs may also provide other advantages over coils springs, such as providing greater spring force, more consistent dimension, more contact area, and a flat bottom surface. However the spring 740 alternatively may be coil spring or other suitable type of spring.

The plunger pieces 716 and 718, and the spring 740, are retained in the hole 712 by a backplate 760. The backplate 760 is threaded into the housing 710, engaging threads 762 on an inner surface that surrounds the hole 712. The backplate 760 has a central hole 764 that allows a threaded rod to pass through. A pair of slots 766 and 768 in an outer face of the backplate 760, to facilitate the backplate 760 being threaded into the housing 710, as part of an assembly process for the securement 700. The housing 710 may be a cast body or a cold-headed housing, with the backplate 760 threaded into the housing 710 until it reaches a mechanical stop, with a minimum tightening torque applied. The result is a solid connection, which is not easily disassembled. As an alternative, the backplate may be staked onto the housing.

The threaded rod securement portion 700 may be as part of a securement used to attach to an additional object, using an attachment of the securement. The attachment is not shown in FIGS. 28-30, but a variety of attachments are shown and described in other embodiments discussed elsewhere, usable for coupling the securement portion 700 to any of a variety of additional objects, such as building structure of various sorts (walls, ceilings, beams, flanges, channels, etc.) and other objects, such as light fixtures (to give one example). The attachment may allow the securement portion 700 to slide or otherwise translate relative to the additional object. As another alternative the attachment may allow the housing 710 to be rotated relative to the attachment.

Figure 31:
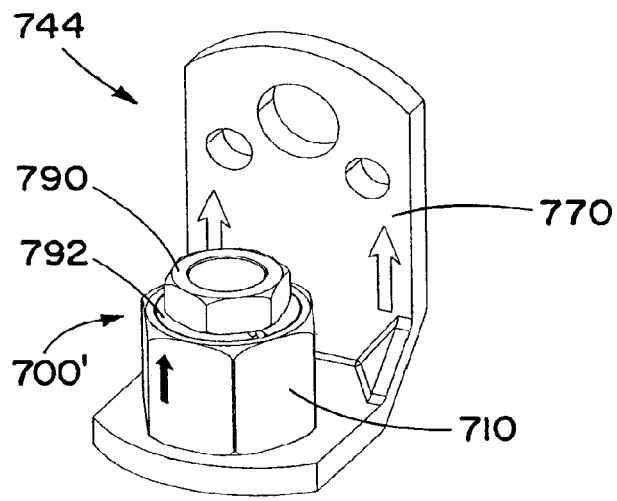
FIG. 31 is an oblique view of another embodiment threaded rod securement.
Figure 32:
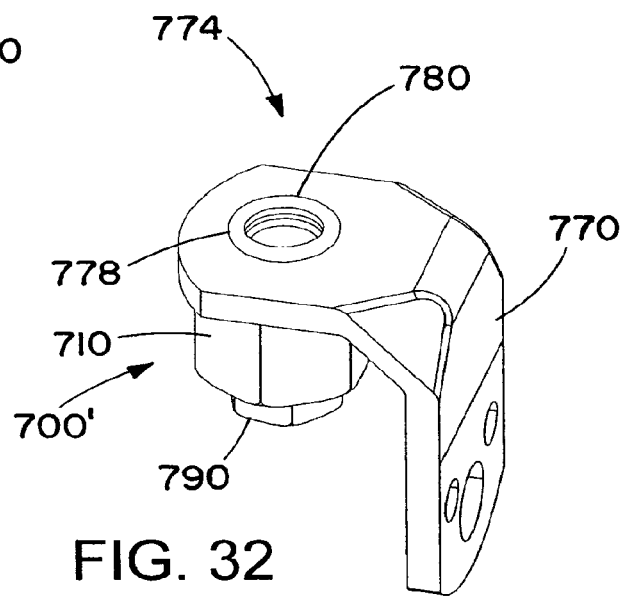
FIG. 32 is another oblique view of the threaded rod securement of FIG. 31.

FIGS. 31 and 32 show one example of an attachment, with a threaded rod securement portion 700' connected to a bracket 770, which may be used for attachment to a wall or other object, to produce a securement 774. The securement 700' is similar to the threaded rod securement portion 700 (FIG. 28), with like parts shown with the same reference numbers. An extension 778 of the housing 710 is riveted to the bracket 770, as shown at 780. The riveted coupling 780 is a loose coupling that allows the housing 710 to rotate relative to the bracket 770 about an axis through the center of the hole 712 of the housing 710. This rotational feature allows adjustment of the position of the threaded rod after its engagement with the securement portion 700'. After the threaded rod is secured between the plunger pieces 716 and 718 (FIG. 29), the housing 710 can be rotated about its axis to move the threaded rod relative to the housing 710. The plunger pieces 716 and 718 rotate along with the housing 710, so as a result of the rotating the threaded rod is moved in the direction of its axis, due to the threaded engagement between the plunger pieces 716 and 718 and the threaded rod. The securement portion 700' includes a locking screw or bolt 790, which is selectively threaded into a modified backplate 792 to selectively lock the plunger pieces 716 and 718 in place. The purpose and operation of the locking screw or bolt 790 is described further below.

Figure 33:
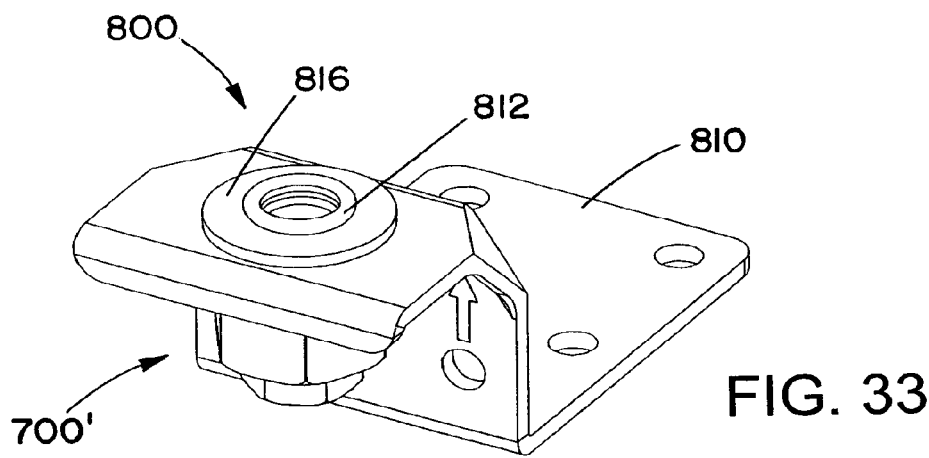
FIG. 33 is an oblique view of yet another embodiment threaded rod securement.
Figure 34:
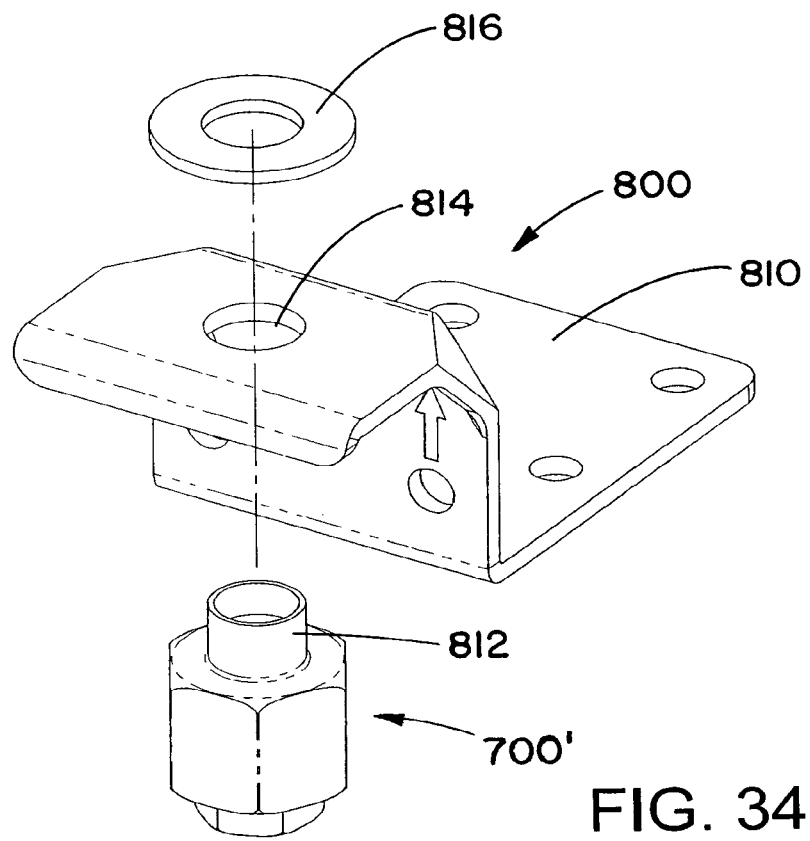
FIG. 34 is an exploded view of the threaded rod securement of FIG. 33.

FIGS. 33 and 34 show another embodiment, a securement 800 that includes the threaded rod securement portion 700' and a bracket 810. The threaded rod securement portion 700' is connected to the bracket 810 by inserting a housing extension 812 into a hole 814 in the bracket 810, and riveting the extension 812 onto a washer 816 that is on an opposite side of the bracket 810 from the housing 710. The rotation of the housing 710 may be used to adjust position of a threaded rod that is already engaged with the threaded rod securement portion 700', as described above with regard to the securement 774 (FIG. 31).

Figure 35:
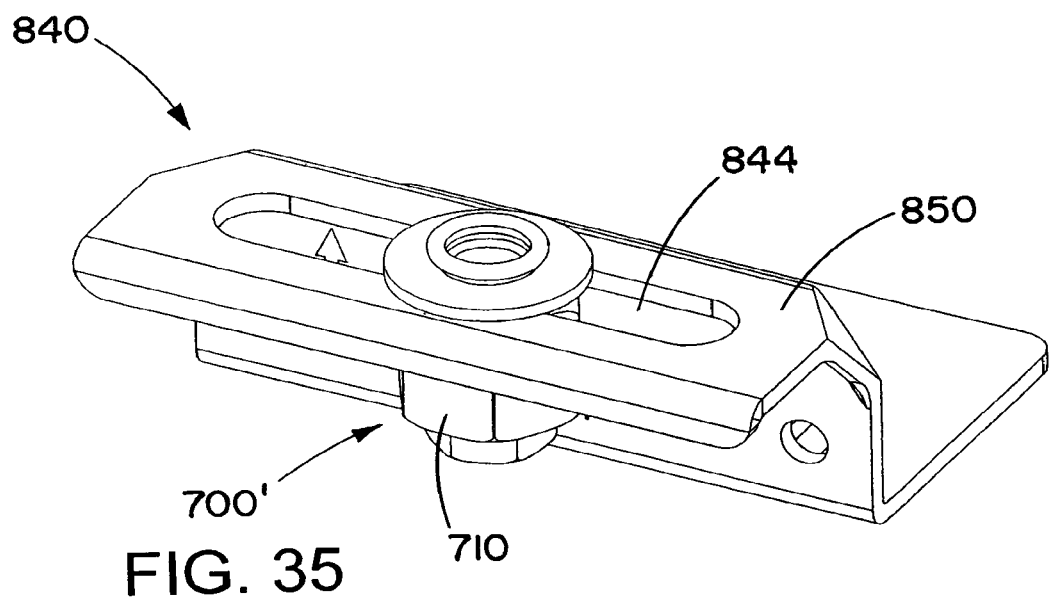
FIG. 35 is an oblique view of still another embodiment threaded rod securement.

FIG. 35 shows another variation, a securement 840 in which the threaded rod securement portion 700' is free to move by sliding along a slot 844 in a bracket 850. In addition to the ability to slide the threaded rod securement portion 700', the housing 710 of the securement portion 700 may also be rotated about its axis to move (adjust) a threaded rod that is already secured within the housing 710.

Figure 36:
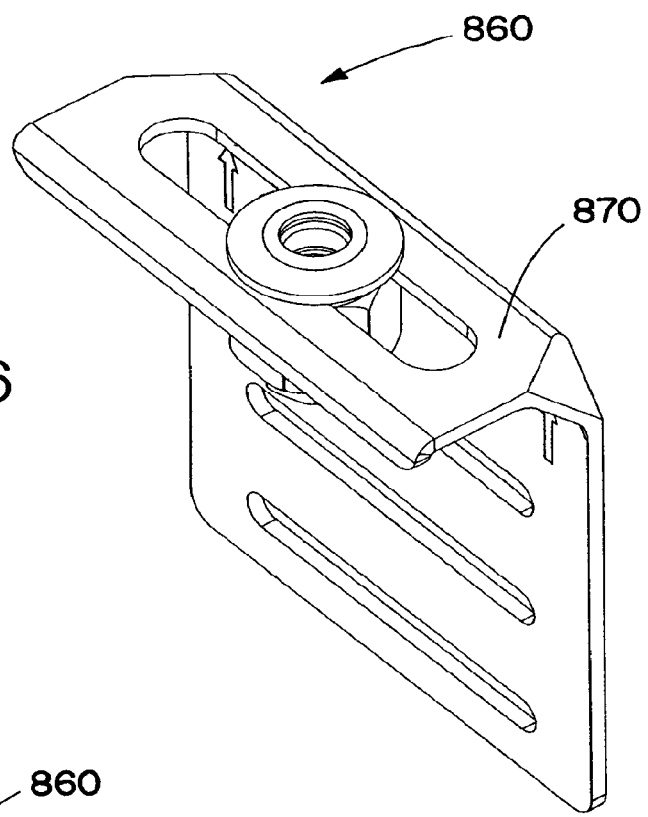
FIG. 36 is an oblique view of a further embodiment threaded rod securement.
Figure 37:
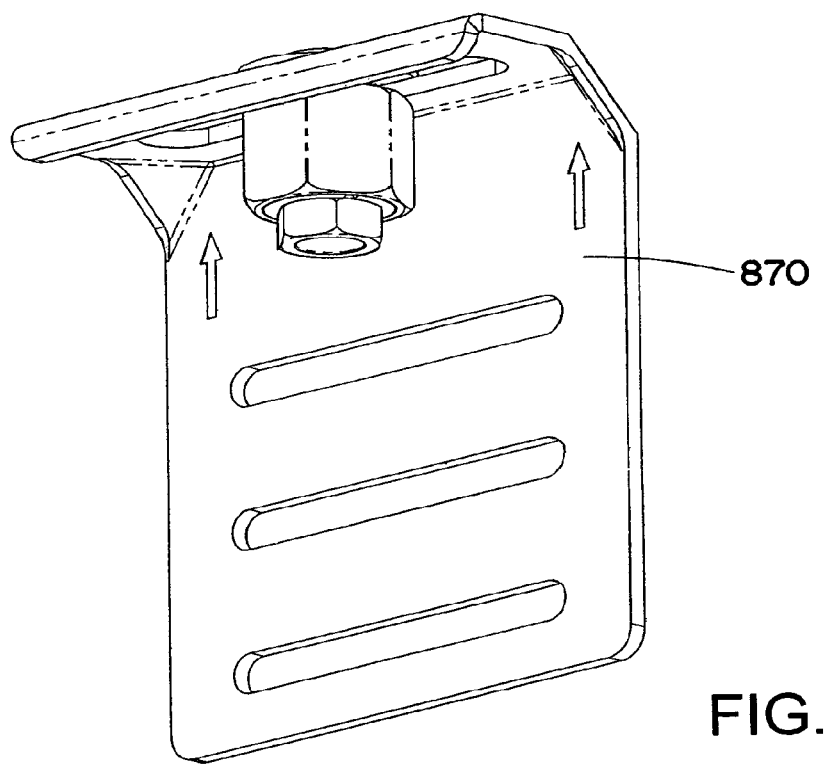
FIG. 37 is another oblique view of the threaded rod securement of FIG. 36.

FIGS. 36 and 37 show a securement 860 that is similar to the securement 840 (FIG. 35), except that the securement 860 has a bracket 870 that is different in configuration than the bracket 850 (FIG. 35). Operation of the securement 860 is similar to that of the securement 840.

Figure 38:
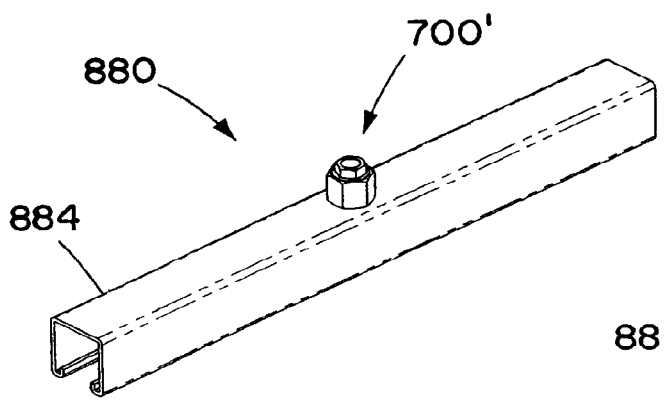
FIG. 38 is an oblique view of a still further embodiment threaded rod securement.
Figure 39:
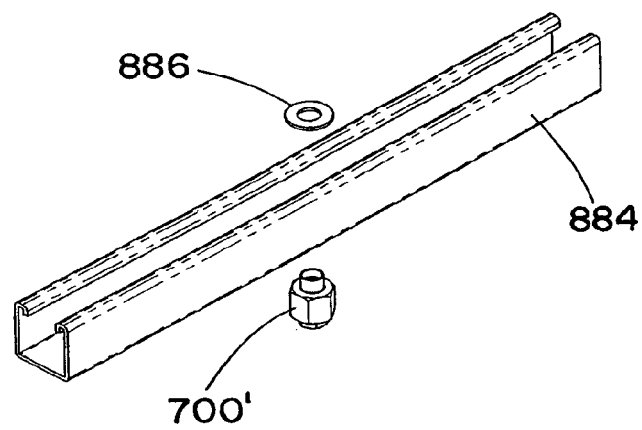
FIG. 39 is an exploded view of the threaded rod securement of FIG. 38.

FIGS. 38-41 show the securement portion 700' as part of various strut assembly threaded rod securements or hangers. FIGS. 38 and 39 show a strut securement or hanger 880 that has the threaded rod securement portion 700' coupled to the center of a strut 884 using a washer 886. The securement 700' is able to rotate about its axis relative to the strut 884.

Figure 40:
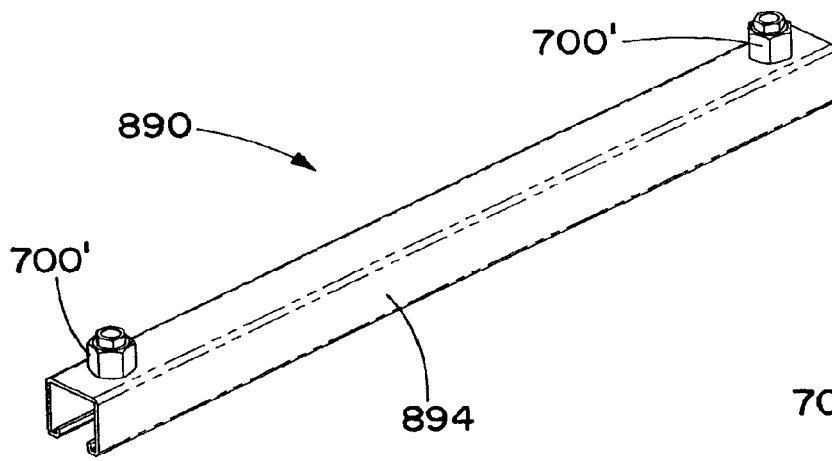
FIG. 40 is an oblique view of another embodiment threaded rod securement.
Figure 41:
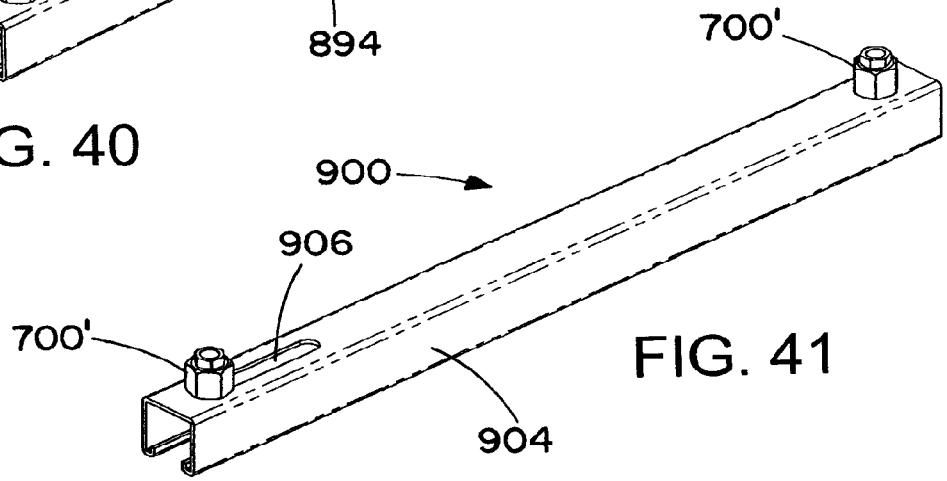
FIG. 41 is an oblique view of yet another embodiment threaded rod securement.

FIG. 40 shows a strut securement 890 in which a pair of securement portions 700' are coupled to opposite ends of a strut 894, to enable the strut securement 890 to engage a pair of threaded rods or similar objects. The securement portions 700' may be rotatable relative to the strut 894. FIG. 41 shows another variation, a securement 900 which has also has a pair of securement portions 700' are coupled to opposite ends of a strut 904, but with one of the securement portions 700' able to slide along a slot 906 in the strut 904. This allows more flexibility in positioning.

Figure 42:
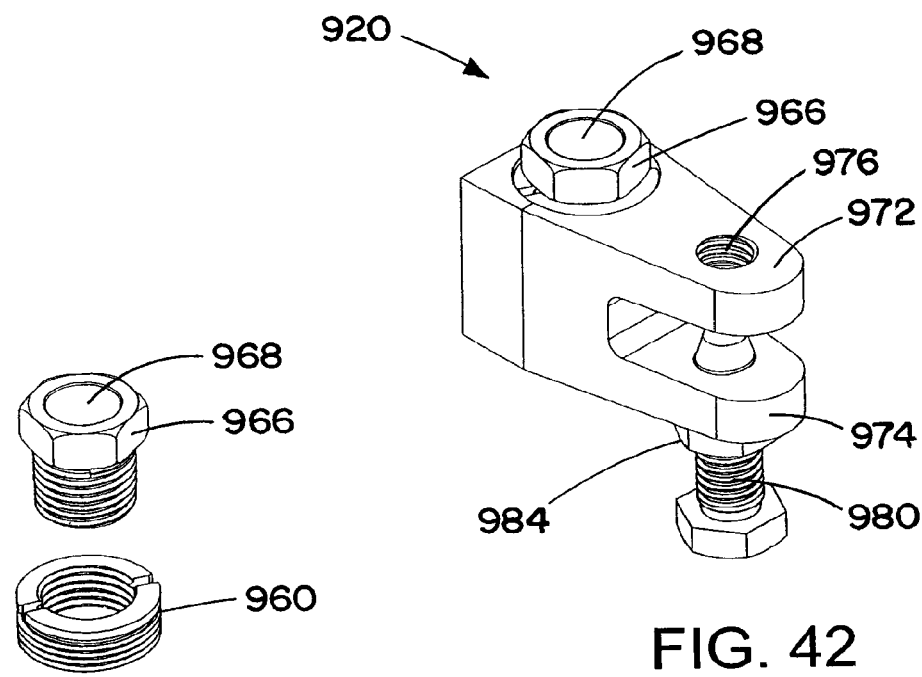
FIG. 42 is an oblique view of still another embodiment threaded rod securement.
Figure 43:
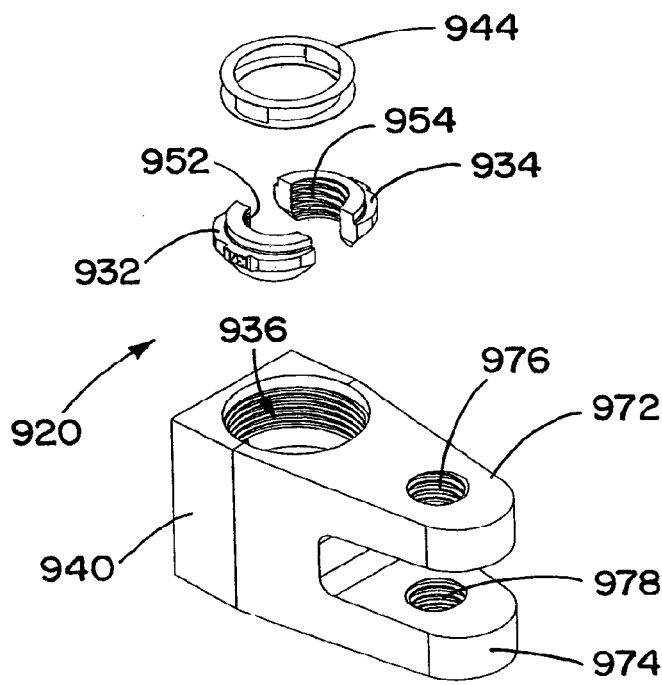
FIG. 43 is an exploded view of the threaded rod securement of FIG. 42.
Figure 43:
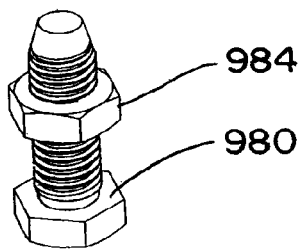

FIGS. 42 and 43 show another threaded rod securement, a beam clamp securement 920. The beam clamp securement 920 includes a quick-lock plunger securement similar in general operation to that described above with regard to the securement portion 700 (FIG. 28). A securement portion 922 includes a pair of plunger pieces 932 and 934 that are located in a hole 936 in a housing 940, and that engaged sloped surfaces around the hole 936. A spring 944, such as a wave spring or coil spring, presses the plunger pieces 932 and 934 into engagement with the sloped inner surfaces, driving the plunger pieces 932 and 934 toward one another and toward an axis of the hole 936. This allows inner surfaces 952 and 954 of the plunger pieces 932 and 934, such as threaded inner surfaces, to engage threads of a threaded rod, to hold the threaded rod in place. A backplate 960 is used to hold the plunger pieces 932 and 934, and the spring 944, within the hole 936.

The beam clamp securement 920 includes a locking mechanism to prevent from the plunger pieces 932 and 934 from lifting up within the hole 936 (within the tapered or sloped inner surface surrounding part of the hole 936). The locking mechanism includes a lock screw or nut 966 that may be selectively threaded into the backplate 960 to engage the plunger pieces 932 and 934, and thereby keep the plunger pieces 932 and 934 from lifting.

The lock screw or nut 966 has a through hole 968 large enough to allow passage of the threaded rod. Alternatively the lock screw or nut 966 may be a solid plug that is suitable for use only when an end of the threaded rod does not extend above the top of the beam clamp securement 920.

An attachment 970 of the beam clamp securement 920 includes a pair of jaw portions or legs 972 and 974, for example extending from a housing 940 of the beam clamp securement 920. The jaw portions or legs 972 and 974 are configured to receive therebetween a flange or other part, such as from structure or another additional object. The legs 972 and 974, and the housing 940, may be parts of a single monolithic piece of material. Threaded holes 976 and 978 in the jaw portions (or legs) 972 and 974 may be used for receiving a bolt 980, which may be used to secure the flange or other part by pressing it against the opposite jaw portion. A nut 984 may be threaded onto the bolt 980 in order to aid in securing the bolt 980 in place.

Figure 44:
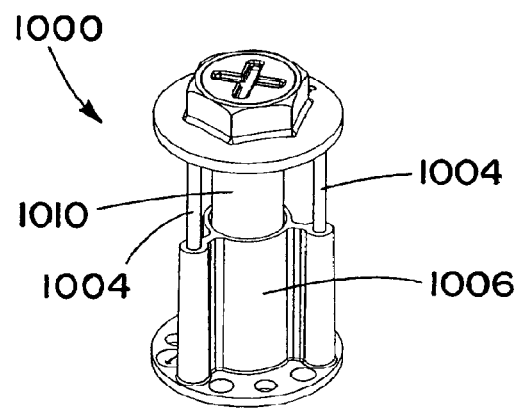
FIG. 44 is an oblique view of a further embodiment threaded rod securement.
Figure 45:
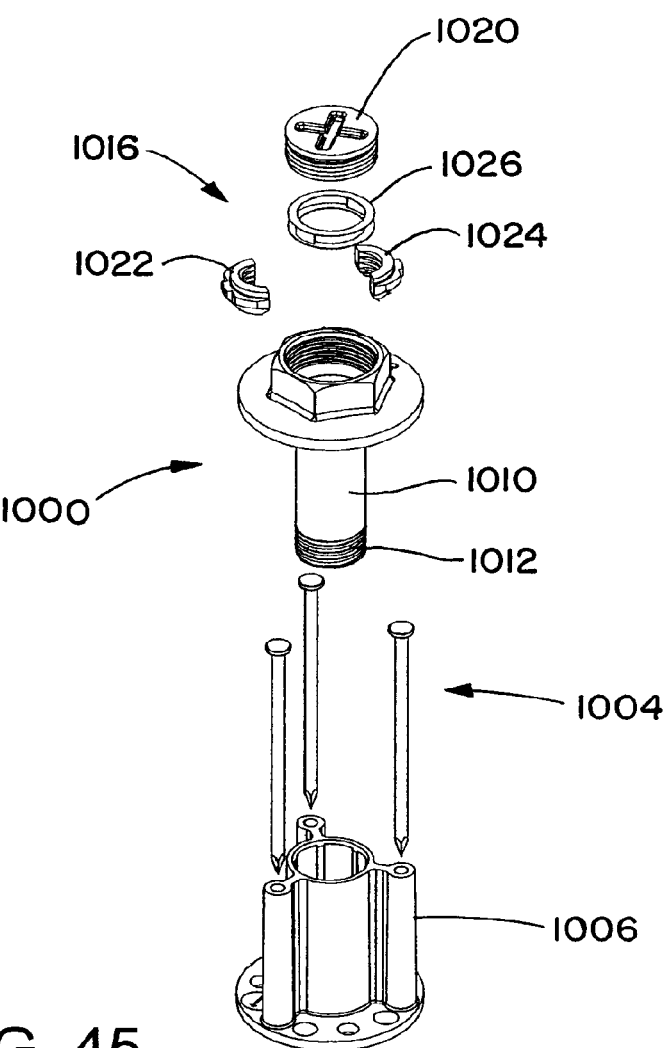
FIG. 45 is an exploded view of the threaded rod securement of FIG. 44.

FIGS. 44 and 45 show a threaded rod securement 1000 for use in concrete, to be set in a plywood form (not shown) prior to pouring of the concrete. The securement 1000 includes nails 1004 that are used to secure a base 1006 of the securement 1000 to the form, with a flat bottom of the base 1006 against the form. A housing 1010 has a ribbed end 1012 that is friction fit into the base 1006. The housing 1010 includes a threaded rod securement portion 1016 that is similar in operation to the securement portion 700 (FIG. 28), used for securing a threaded rod. The securement portion 1016 includes a backplate 1020 that fully closes off one end of the hole in the housing 1010. In installation, concrete is poured into the form after the securement 1000 is nailed onto the form. The backplate 1020 keeps the concrete from getting into the hollow housing 1010, where plunger pieces 1022 and 1024, and a spring 1026, are located. After the concrete is cured, the form may be removed, and the protruding sharp ends of the nails 1004 may be sheared off, for example using a hammer. The securement 1000 may then be used as a blind hole for receiving and securing threaded rod. Threaded rod may be pushed in through a hole in the base 1006, and secured by the plunger pieces 1022 and 1024. Secured threaded rod may be unscrewed from the engagement, if needed.

Figure 46:
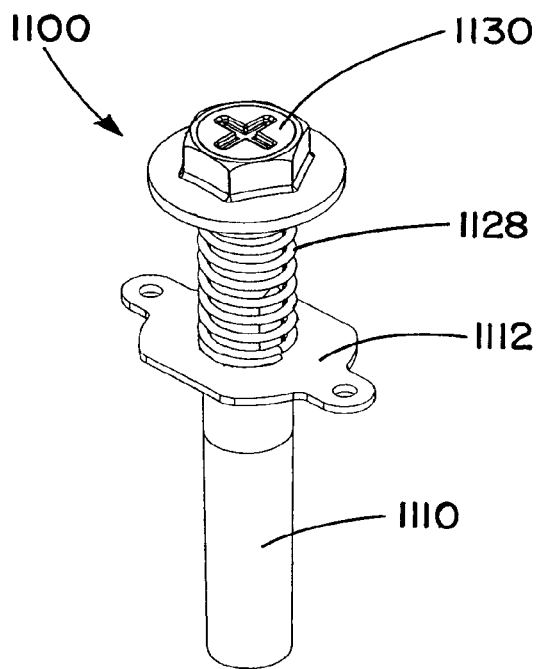
FIG. 46 is an oblique view of a still further embodiment threaded rod securement.
Figure 47:
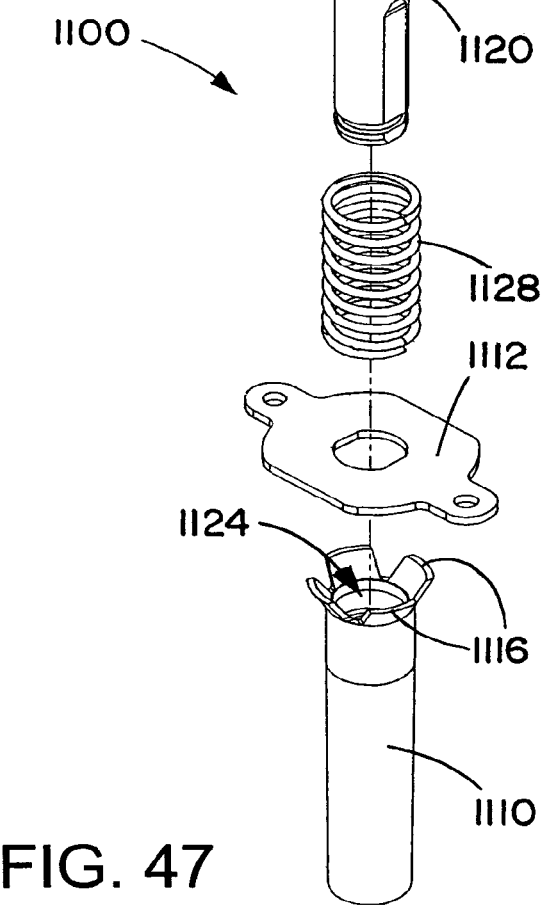
FIG. 47 is an exploded view of the threaded rod securement of FIG. 46.

FIGS. 46 and 47 show a metal decking rod securement 1100, also used for producing a threaded rod securement for concrete. A deck holder or anchor 1110 and a bracket 1112 are used for engaging a hole in metal decking (not shown), after assembly of the decking, such as by hammering into hole that is sized to engage outward-protruding flanges 1116 at one end of the deck holder or anchor 1110. When installed, the deck holder 1110 protrudes through the hole. A housing 1120 is ribbed and secured within the deck anchor 1110, with the housing 1120 engaging a rib on the inside surface of the deck holder 1110 (surrounding a hole 1124). A spring 1128 helps maintain proper position of the housing 1120 relative to the deck holder 1110. Further, the combination and interface between the bracket 1112 and housing 1120 provides rigid positioning to ensure the housing 1120 remains perpendicular to the decking when concrete is poured over the metal decking. The workings within the housing 1120 are similar to those of the housing 1010 (FIG. 45), with a backplate 1130 used to keep concrete from entering the housing 1120 when concrete is poured over the metal decking. The resulting blind hole may be used to secure threaded rod, with the threaded rod inserted through hole 1124 and into the housing 1010, where it is clamped by plunger pieces 1132 and 1134 within the housing 1120.

Figure 48:
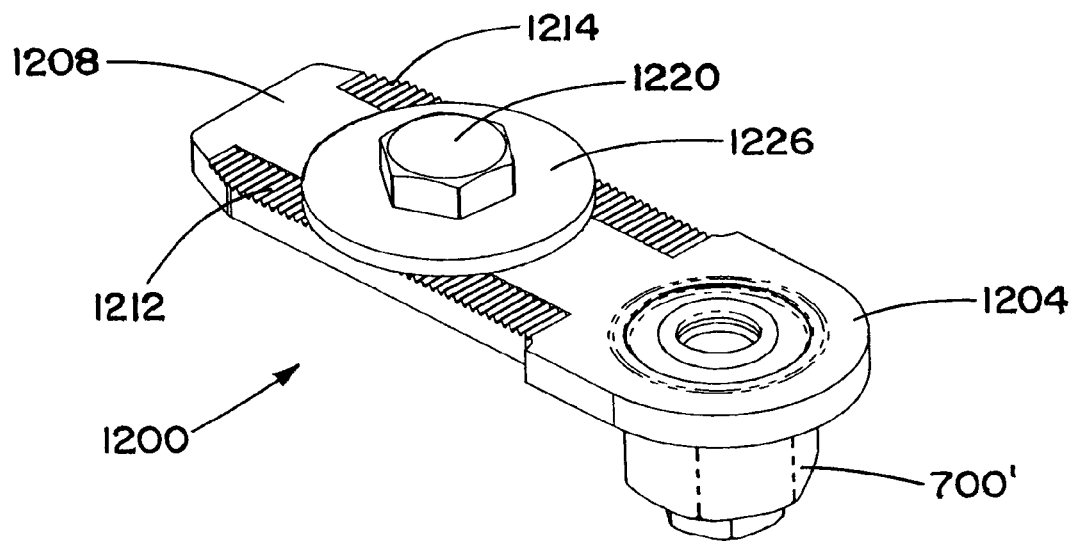
FIG. 48 is an oblique view of a still another embodiment threaded rod securement.
Figure 49:
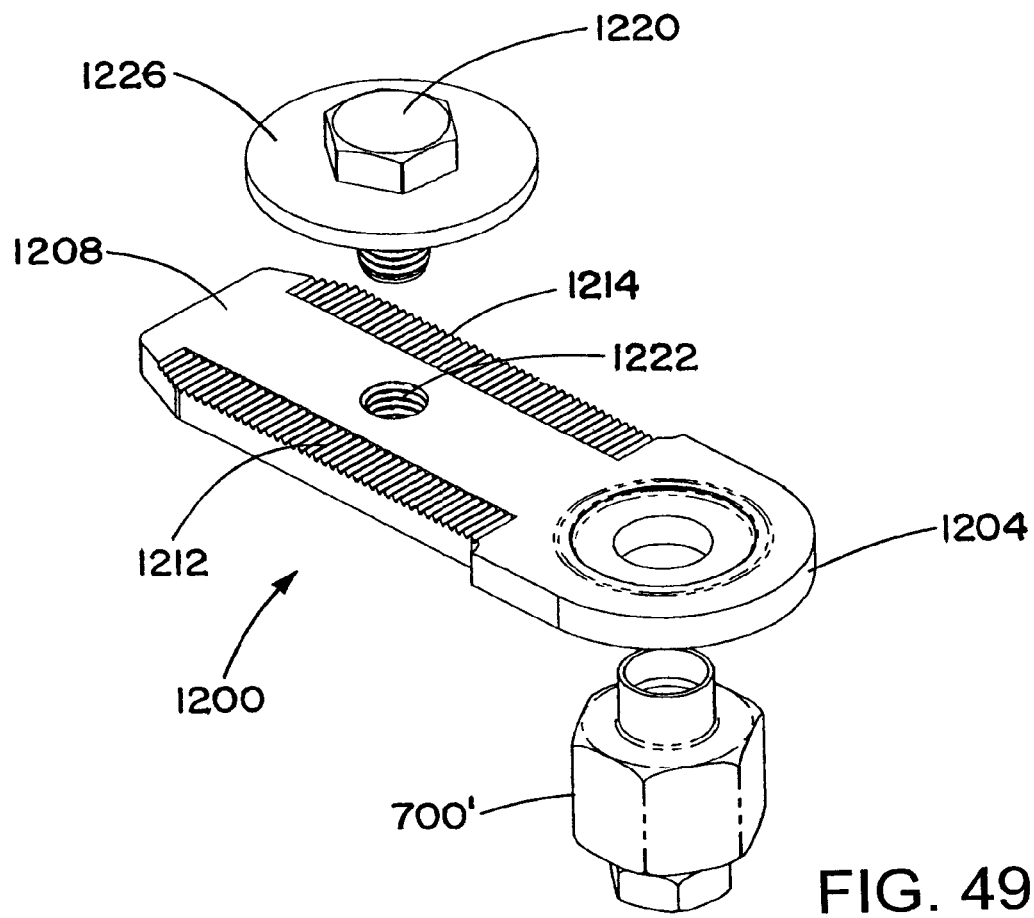
FIG. 49 is an exploded view of the threaded rod securement of FIG. 48.

FIGS. 48 and 49 show a threaded rod securement 1200 for engaging a strut or channel, such as the strut 270 (FIGS. 15 and 16). The securement 1200 includes a securement portion 700' that is riveted to a planar housing 1204, such that the securement portion 700' can be rotated as a unit about the riveted coupling. The housing 1204 has a tongue 1208 that extends outward from where the housing 1204 is coupled to the securement portion 700'. The tongue 1208 is configured to fit into a strut or channel. A top face of the tongue 1208 has serrations 1212 and 1214 that contact the bottom (inner) surfaces of the rails of the strut, when the tongue is inserted into the strut. A screw 1220 engages a threaded hole 1222 in the tongue 1208. The screw 1220 is used to press a washer 1226 against the tops of the strut rails, to clamp the securement 1200 in place, with the strut rails between the washer 1226 and the serrations 1212 and 1214.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A device for securing a threaded rod to a building structure, the device comprising:
   a rod locking body with an internal passage that includes an inward taper, the rod locking body having an attachment portion to attach the rod locking body to the building structure;
   a plunger disposed at least partly within the internal passage, with a first threaded portion to engage the threaded rod; and
   at least one biasing element arranged to bias the plunger towards a narrow end of the inward taper;
   the inward taper urging the first threaded portion of the plunger towards the threaded rod to secure the threaded rod to the rod locking body; and
   the attachment portion including a body extension that extends from a first end of the rod locking body and is configured to receive a portion of the threaded rod therein when the threaded rod is inserted into the internal passage, a width of the body extension being smaller than the rod locking body at the first end.

2. The device of claim 1, for securing the threaded rod to a strut that includes a hole, wherein the width of the body extension is smaller than an internal dimension of the hole, and wherein the body extension extends through the hole to secure the rod locking body to the strut.

3. The device of claim 2, further comprising:
a washer disposed on the body extension proximate the first end of the rod locking body.

4. The device of claim 3, with the hole in the strut configured as an elongate slot, wherein the washer is aligned with the elongate slot when the body extension secures the rod locking body to the strut.

5. The device of claim 2, further comprising:
external threads on the body extension; and
a nut threaded onto the external threads on the body extension to secure the rod locking body to the strut, with the nut on an opposite side of the strut from the rod locking body.

6. The device of claim 5, wherein the inward taper tapers inwardly from a perspective moving from a second end of the rod locking body towards the body extension.

7. A device for securing a threaded rod, the device comprising:
a strut with a hole;
a rod locking body with an internal passage that includes an inward taper, a width of the rod locking body being larger than a width of the hole;
a body extension extending from a first end of the rod locking body and configured to receive a portion of the threaded rod therein, a width of the body extension being smaller than the width of the hole;
a first plunger piece movable within the internal passage, with a first threaded portion to engage the threaded rod;
a second plunger piece movable within the internal passage, with a second threaded portion to engage the threaded rod; and
at least one biasing element arranged to bias the first plunger piece and the second plunger piece towards a narrow end of the inward taper;
the inward taper urging the first threaded portion of the first plunger piece towards the threaded rod to secure the threaded rod to the rod locking body; and
the body extension extending through the hole to secure the rod locking body to the strut.

8. The device of claim 7, further comprising:
a washer disposed on the body extension proximate the first end of the rod locking body.

9. The device of claim 8, wherein the hole is configured as an elongate slot and the washer is aligned with the elongate slot.

10. The device of claim 7, further comprising:
external threads on the body extension; and
a nut threaded onto the external threads on the body extension to secure the rod locking body to the strut, with the nut on an opposite side of the strut from the rod locking body.

11. The device of claim 10, wherein the inward taper of the internal passage tapers inwardly from a perspective moving from the first end of the rod locking body away from the body extension.

12. The device of claim 7, wherein the internal passage of the rod locking body is a first internal passage; and
wherein the body extension includes a second internal passage that is substantially axially aligned with the first internal passage.

13. A device for securing a threaded rod, the device comprising:
a rod locking body with a first internal passage that includes an inward taper;
a cylindrical body extension extending from a first end of the rod locking body, a diameter of the cylindrical body extension being smaller than a width of the rod locking body at the first end, and the cylindrical body extension including a second internal passage that is substantially axially aligned with and opens into the first internal passage;
a plunger at least partly within the first internal passage, with a first threaded portion to engage the threaded rod; and
at least one biasing element arranged to bias the plunger towards a narrow end of the inward taper;
the inward taper urging the first threaded portion of the plunger towards the threaded rod to secure the threaded rod to the rod locking body.

14. The device of claim 13, for use with a strut that includes a hole, further comprising:
a washer disposed on the cylindrical body extension proximate the first end of the rod locking body;
wherein the cylindrical body extension extends through the hole, with the washer aligned with the hole in the strut, to secure the rod locking body to the strut.

15. The device of claim 14, with the hole in the strut including an elongate slot, wherein the washer is aligned with the elongate slot when the cylindrical body extension extends through the hole in the strut.

16. The device of claim 13, for use with a strut, further comprising:
external threads on the cylindrical body extension; and
a nut threaded onto the external threads on the cylindrical body extension to secure the rod locking body to the strut, with the nut on an opposite side of the strut from the rod locking body.

17. The device of claim 16, wherein the inward taper of the first internal passage tapers inwardly from a perspective moving from a second end of the rod locking body towards the cylindrical body extension.

18. The device of claim 16, wherein a first cross section of the nut, along a first plane transverse to a rotational axis of the nut, is hexagonal; and
wherein a second cross-section of the nut, along a second plane transverse to the rotational axis of the nut, is circular.

19. The device of claim 18, wherein a cross section of the rod locking body, along a plane transverse to an axis of the first internal passage, is hexagonal.

* * * * *